US012780355B2

(12) United States Patent
Stock et al.

(10) Patent No.: US 12,780,355 B2
(45) Date of Patent: Nov. 3, 2026

(54) MULTI-PIECE TUNNEL FOR A SNOW VEHICLE

(71) Applicant: Polaris Industries Inc., Medina, MN (US)

(72) Inventors: Jacob L. Stock, Dellwood, MN (US); Timothy W. Stenlund, Minneapolis, MN (US); David W. Christian, Saint Francis, MN (US); John B. Pircon, Stacy, MN (US); Michael A. Hedlund, Roseau, MN (US); Matthew J. Prusak, Salol, MN (US); Cody S. Kofstad, Warroad, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 995 days.

(21) Appl. No.: 17/564,390

(22) Filed: Dec. 29, 2021

(65) Prior Publication Data

US 2022/0212754 A1 Jul. 7, 2022

Related U.S. Application Data

(60) Provisional application No. 63/134,873, filed on Jan. 7, 2021.

(51) Int. Cl.
*B62M 27/02* (2006.01)

(52) U.S. Cl.
CPC ....... *B62M 27/02* (2013.01); *B62M 2027/023* (2013.01); *B62M 2027/028* (2013.01)

(58) Field of Classification Search
CPC ............ B62M 27/02; B62M 2027/023; B62M 2027/028; B62K 19/22
USPC ............................................ 156/92; 180/190
See application file for complete search history.

(56) References Cited

U.S. PATENT DOCUMENTS

| | | | | |
|---|---|---|---|---|
| 5,791,429 A * | 8/1998 | Bergman | B62M 27/02 | 180/9.5 |
| 6,926,107 B2 * | 8/2005 | Nishijima | B62M 27/02 | 180/190 |
| 7,533,749 B1 | 5/2009 | Sampson et al. | | |
| 7,913,785 B2 * | 3/2011 | Korsumaki | F28D 1/0246 | 180/68.1 |
| 8,191,665 B1 * | 6/2012 | Sampson | B62J 25/04 | 280/900 |

(Continued)

FOREIGN PATENT DOCUMENTS

| | | | | |
|---|---|---|---|---|
| CA | 2012024 * | 9/1991 | B62D 23/00 |
| JP | 2020158921 A * | 10/2020 | |
| WO | WO-2018093520 A2 * | 5/2018 | B32B 27/08 |

OTHER PUBLICATIONS

Canadian Office Action dated Feb. 13, 2023 in corresponding Canadian Application No. 3144937 (8 pages).

*Primary Examiner* — Anne Marie M Boehler
(74) *Attorney, Agent, or Firm* — Merchant & Gould P.C.

(57) ABSTRACT

A tunnel is configured to cover at least a portion of an endless track of a snow vehicle. The tunnel has a top plate extending longitudinally. The top plate has a first flange extending from a first side edge and a second side flange extending from a second side edge. The tunnel further has a first sidewall coupled to the first flange extending generally parallel with the first flange. A second sidewall is coupled to the second flange extending generally parallel with the second flange.

46 Claims, 42 Drawing Sheets

(56) References Cited

U.S. PATENT DOCUMENTS

| | | | | |
|---|---|---|---|---|
| 8,528,683 B2 * | 9/2013 | Beavis | B62M 27/02 | |
| | | | 180/311 | |
| 8,567,546 B2 * | 10/2013 | Berg | B62M 27/02 | |
| | | | 180/190 | |
| 10,215,083 B2 * | 2/2019 | Vezina | B62M 27/02 | |
| 11,358,661 B2 * | 6/2022 | Laugen | B62D 55/10 | |
| 2012/0205902 A1 * | 8/2012 | Beavis | B62M 27/02 | |
| | | | 280/781 | |
| 2013/0032418 A1 * | 2/2013 | Ripley | B62D 55/104 | |
| | | | 180/9.1 | |
| 2013/0032420 A1 * | 2/2013 | Mills | B62M 27/02 | |
| | | | 180/186 | |
| 2014/0251707 A1 * | 9/2014 | Sampson | B62M 27/02 | |
| | | | 180/182 | |
| 2022/0340233 A1 * | 10/2022 | Edwards | B62M 27/00 | |

* cited by examiner

MULTI-PIECE TUNNEL FOR A SNOW VEHICLE

CROSS REFERENCE TO RELATED APPLICATION

This application claims the benefit of U.S. Provisional Application No. 63/134,873, filed on Jan. 7, 2021. The entire disclosure of the above application is incorporated herein by reference.

FIELD

The present disclosure relates to a tunnel that partially covers a track of a tracked vehicle and, more particularly, to a tapered short tunnel for use on a tracked vehicle, such as a snowmobile.

BACKGROUND

This section provides background information related to the present disclosure which is not necessarily prior art.

Tracked vehicles, such as snowmobiles or snow bikes, generally include one front ski or a pair of front skis for steering and a rear endless track for driving or propelling the snowmobile. A chassis, or body, of the snowmobile includes a tunnel that is positioned over the track to support a seat and prevent snow from hitting the snowmobile occupants.

The tunnel is commonly formed of metal and is therefore a significant cause of weight for the vehicle. Snowmobiles can traverse various terrain and conditions. In deep powder snow that occurs frequently on mountain terrain, it is not uncommon to be riding in several feet of powder snow. Such riding can result in forming a deep trench or trenching in the snow because of the track. Such trenching can cause the rear of the snowmobile to fall into the trench and get stuck. Reducing the weight of the snow vehicle increase the ease in which the operator can free the vehicle from the stuck position.

Further, reducing the weight reduces fuel consumption and increase maneuverability.

SUMMARY

This section provides a general summary of the disclosure, and is not a comprehensive disclosure of its full scope or all of its features.

In one aspect of the disclosure, a tunnel is configured to cover at least a portion of an endless track of a snow vehicle. The tunnel has a top plate extending longitudinally. The top plate has a first flange extending from a first side edge and a second side flange extending from a second side edge. The tunnel further has a first sidewall coupled to the first flange. The first sidewall extends generally parallel with the first flange. A second sidewall is coupled to the second flange. The second sidewall extends generally parallel with the second flange.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 35:
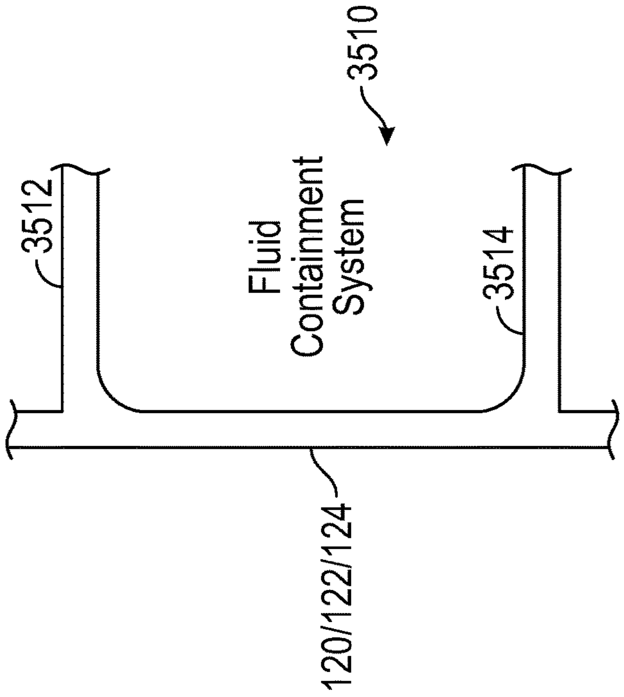

FIG. 35 is a cross-sectional view of a fluid containment system formed with at least one of the top plate 114, the first sidewall 120 or the second sidewall 122.

Figure 36A:
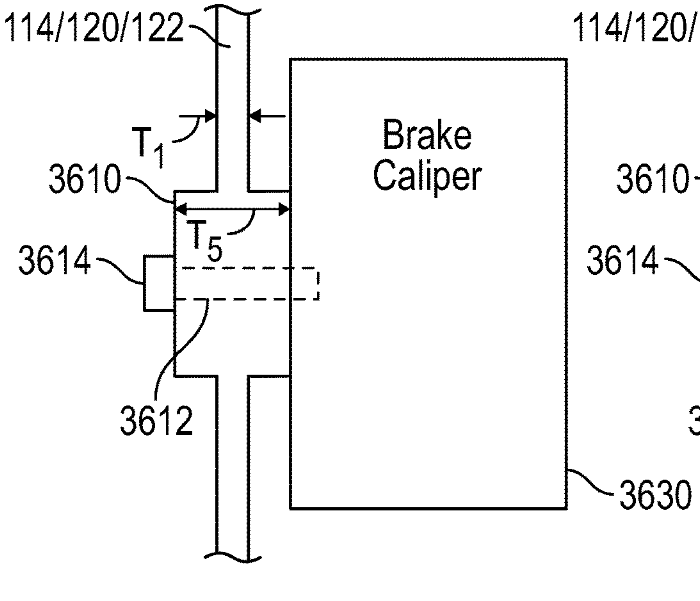

FIG. 36A is a cross-sectional view of a mount for coupling a brake caliper of FIG. 36A thereto.

Figure 36B:
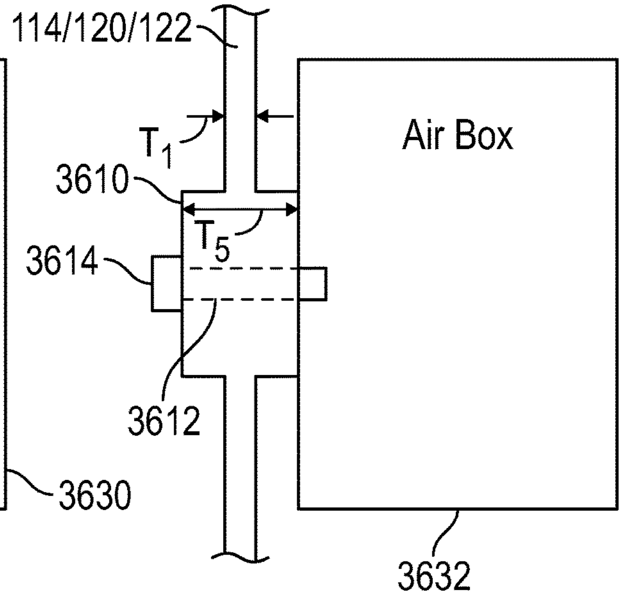

FIG. 36B is a mount for mounting an air box thereto.

Figure 36C:
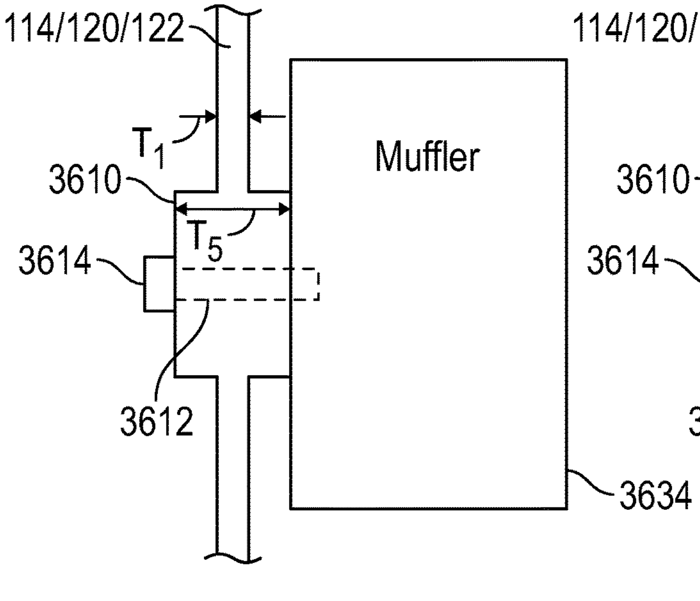

FIG. 36C is a mount for mounting a muffler thereto.

Figure 36D:
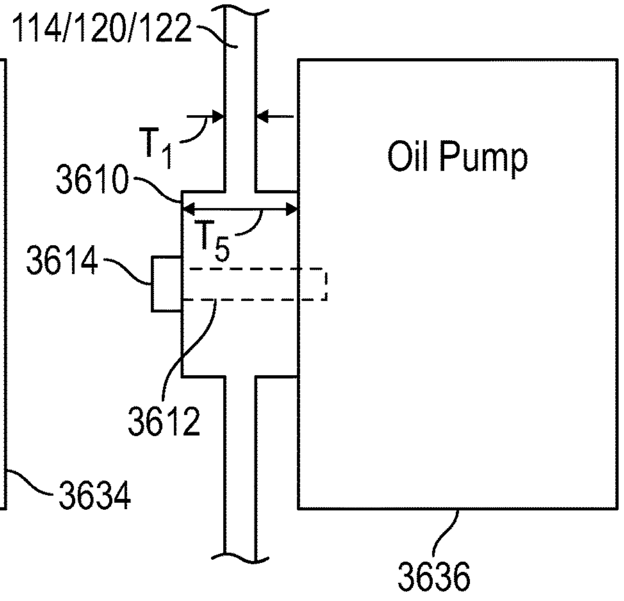

FIG. 36D is a mount for mounting an oil pump 3636 thereto.

Figure 36E:
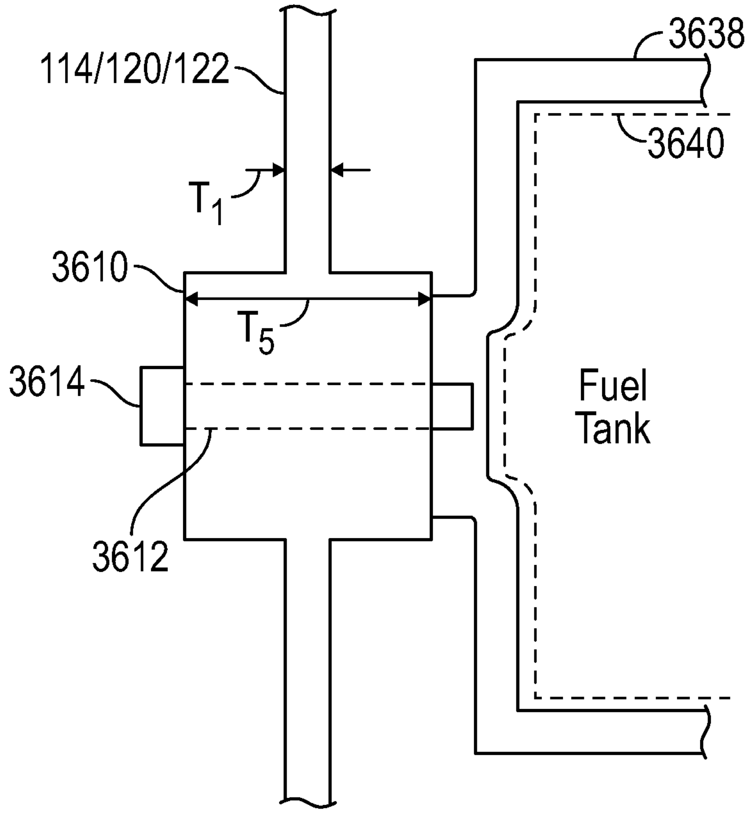

FIG. 36E is a mount for mounting a fuel tank 3636 thereto.

Corresponding reference numerals indicate corresponding parts throughout the several views of the drawings.

DETAILED DESCRIPTION

Example embodiments will now be described more fully with reference to the accompanying drawings.

With initial reference to FIGS. 1-6, an exemplary vehicle in accordance with the present disclosure is illustrated. Although the vehicle is illustrated as a snowmobile 10, numerous aspects of the present disclosure may be included with any other suitable vehicle as well. The snowmobile 10 may be any suitable type of snowmobile, such as any suitable trail snowmobile, sport trail snowmobile, touring snowmobile, performance snowmobile, utility snowmobile (such as any snowmobile suitable for search and/or rescue, law enforcement, military operations, etc.), crossover snowmobile, mountain snowmobile, youth snowmobile, etc.

The snowmobile 10 generally includes a front end 12 and a rear end 14. At the front end 12 is a front suspension 16. At the rear end 14 is a rear suspension 18. The front suspension 16 and the rear suspension 18 support a chassis 20.

The front suspension 16 includes shock absorbers 22, each one of which is connected to a ski 24. The shock absorbers 22 may be any dampening devices suitable for absorbing shock resulting from the skis 24 passing over uneven terrain. The skis 24 are steered in part by a suitable steering device, such as handlebars 26. The rear suspension comprises a torque arm 29, Coupled to the rear suspension 18 is a belt or track 30, which is endless or continuous. Rotation of the track 30 propels the snowmobile 10. The track 30 is circulated through a tunnel 32 defined at least in part by the chassis 20 and is positioned by the torque arm 29 that id coupled to the tunnel as will be described in more detail below. The tunnel 32 is tapered at the rear end 14, as described in detail herein. A flap 34 is mounted at the rear end 14 and blocks snow and other debris from being "kicked-up" by the track 30.

Mounted to the chassis 20 and atop the tunnel 32 is a seat 40 for the operator of the snowmobile 10. On both sides of the chassis 20 or tunnel 32 are running boards 42, upon which the operator may rest his or her feet when seated on the seat 40. The seat 40 is positioned to allow the driver to grasp the handlebars 26 for steering the snowmobile 10. The handlebars 26 are mounted to a steering rod 28, which protrudes out from within the center console 44. At the center console 44 is a fuel cap 46 of a fuel tank 48.

At the front end 12 of the snowmobile 10 is a hood assembly 50, which is mounted on top of a nose pan 68. Mounted to the hood assembly 50 and protruding from a forward most end thereof, is a front bumper 52. The hood assembly 50 houses headlights 54. An optional windshield 56 is connected to an uppermost portion of the hood assembly 50. Associated with the hood assembly 50 is a display 58 viewable by the operator when seated on the seat 40. Mounted to opposite sides of the hood assembly are body panels 60, which are advantageously interchangeable.

Figure 1:
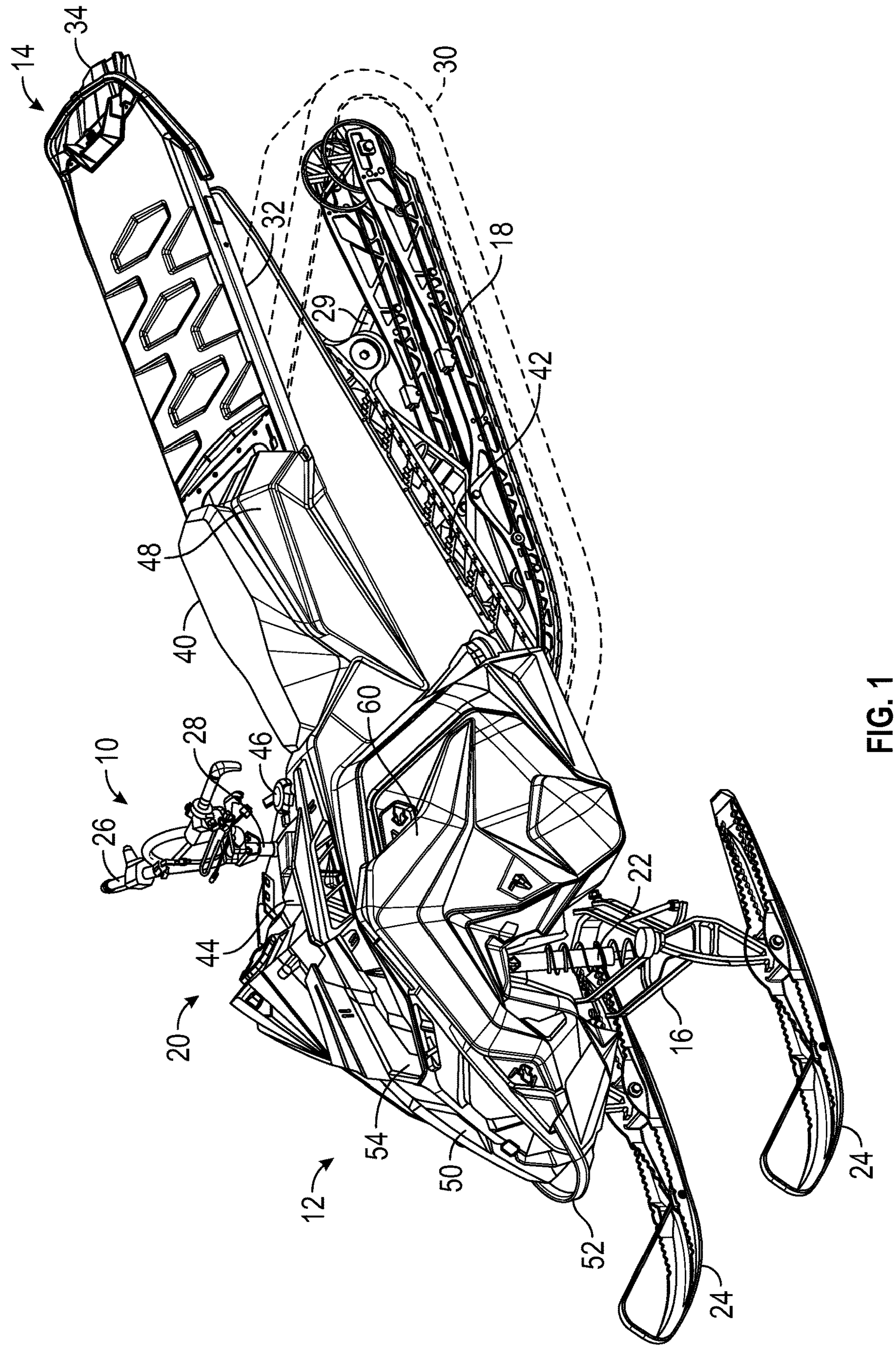
FIG. 1 is a perspective view of an exemplary snowmobile in accordance with the present disclosure.
Figure 2:
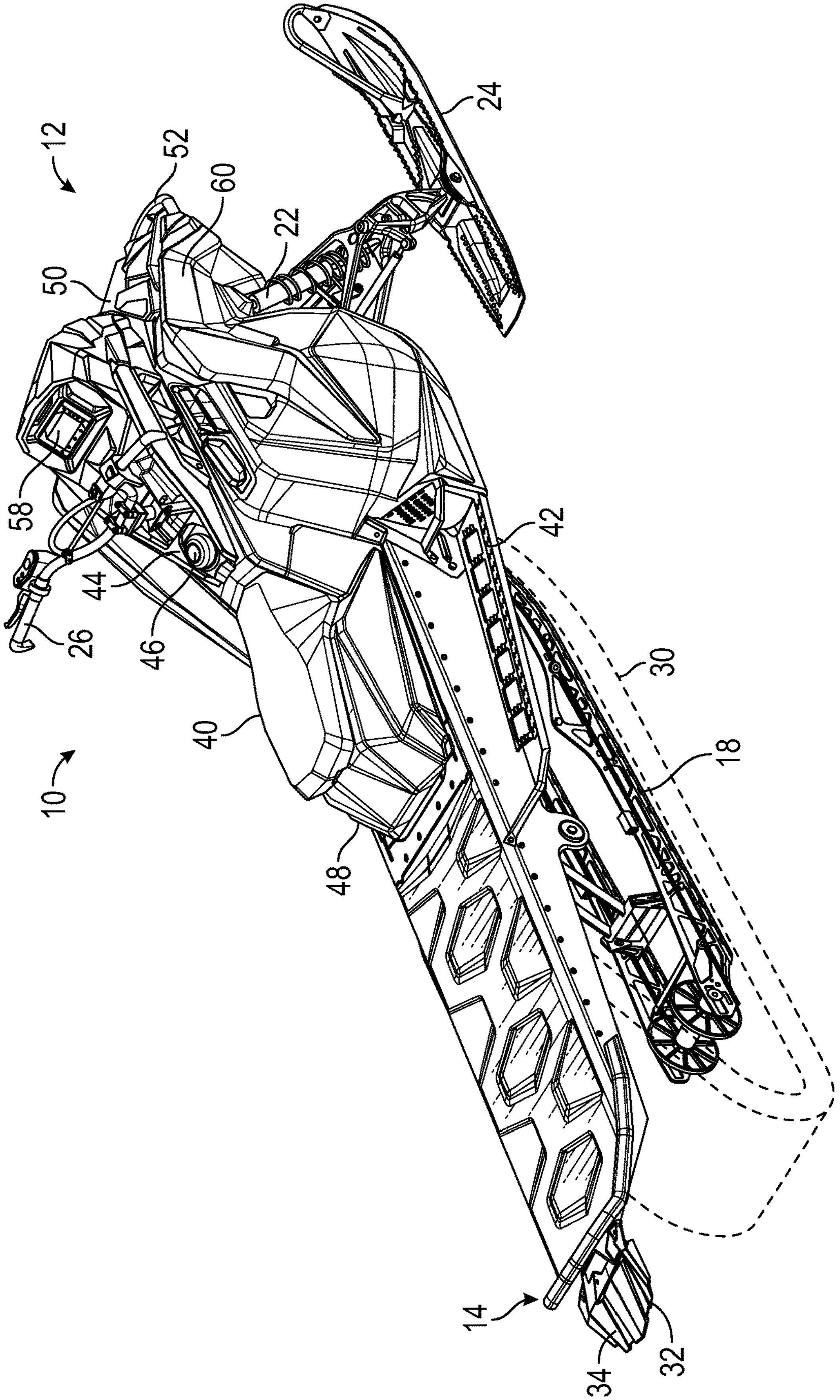
FIG. 2 is another perspective view of the snowmobile of FIG. 1.
Figure 3:
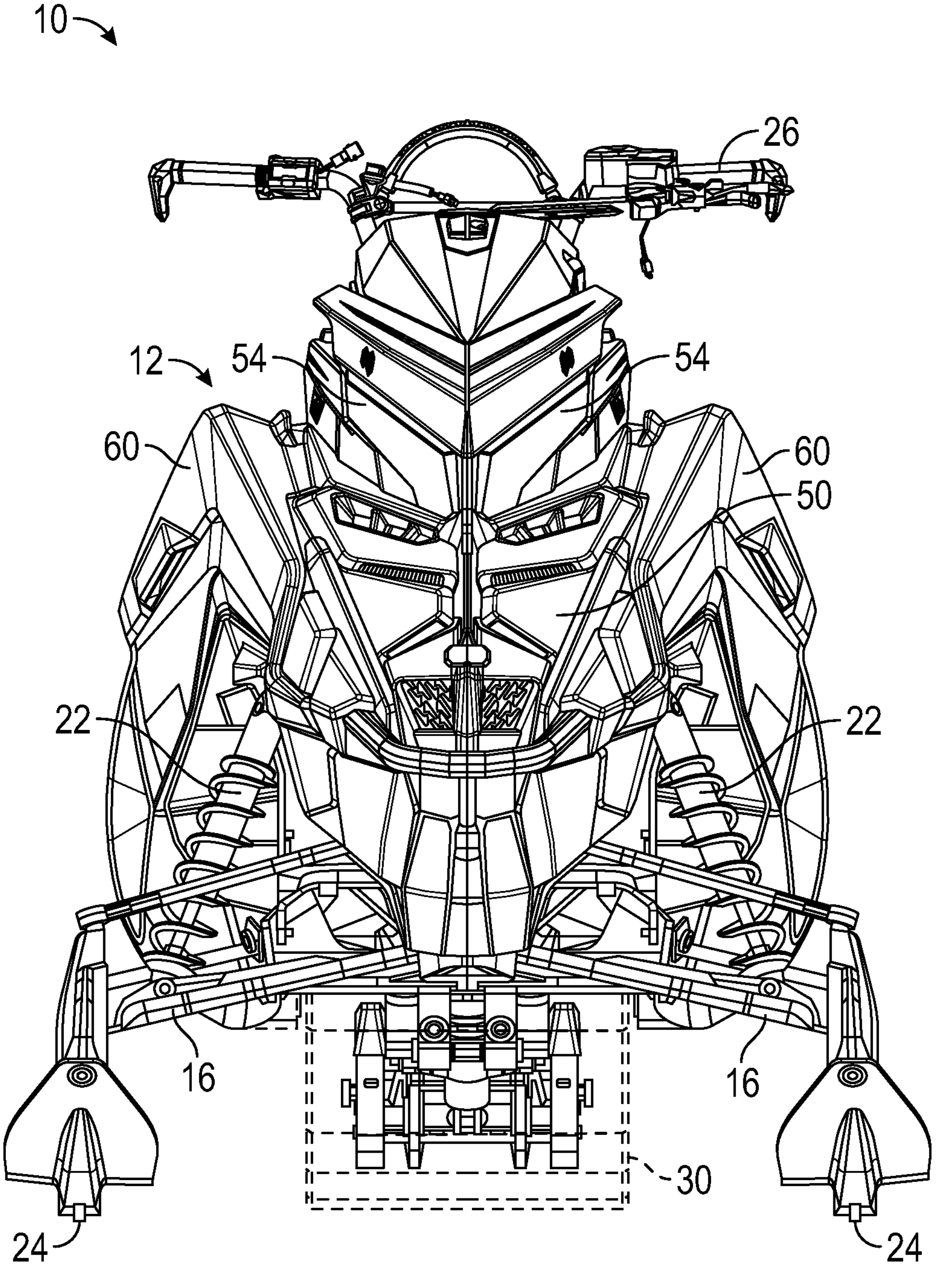
FIG. 3 is a front view of the snowmobile of FIG. 1.
Figure 4:
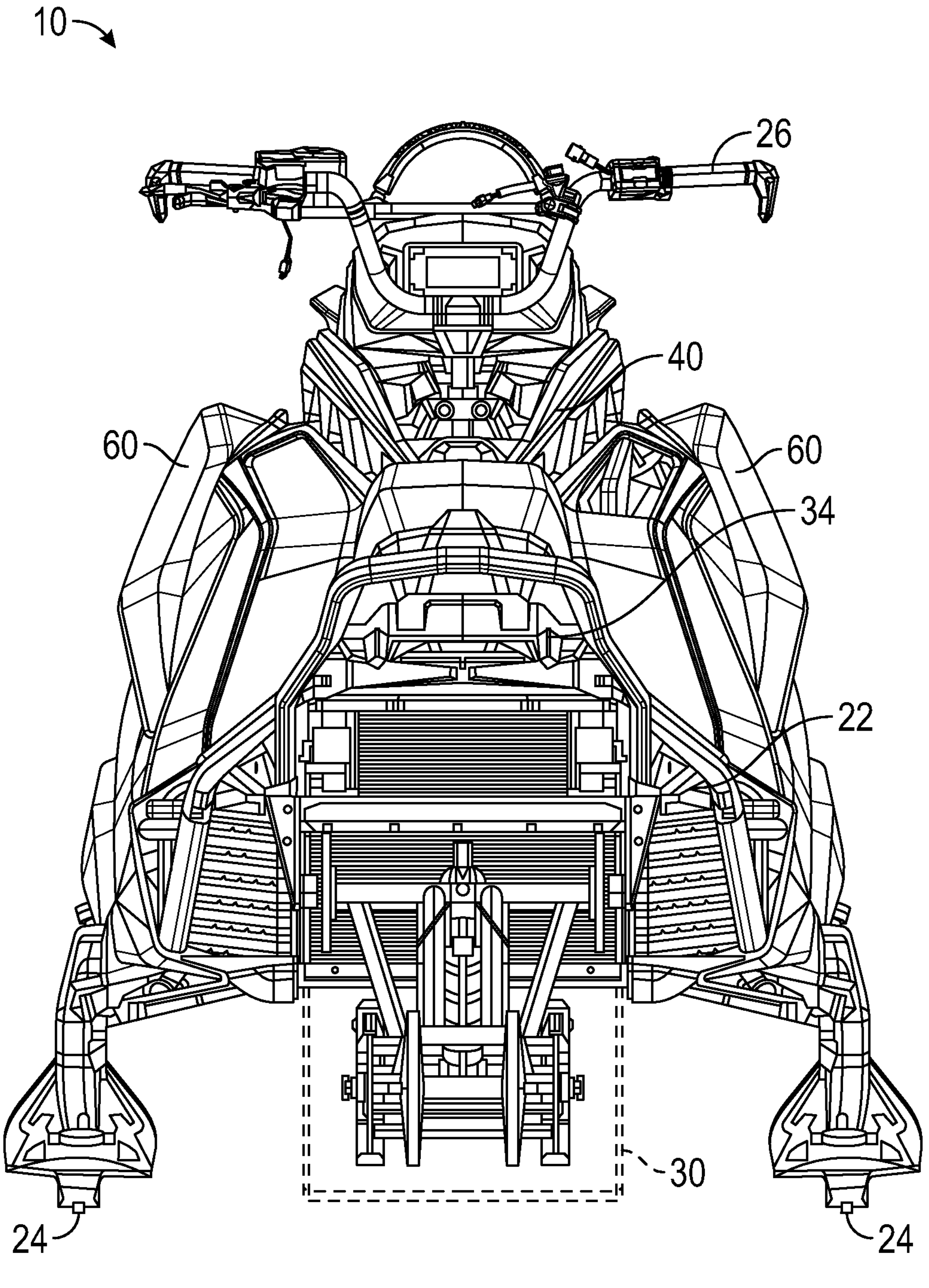
FIG. 4 is a rear view of the snowmobile of FIG. 1.
Figure 5:
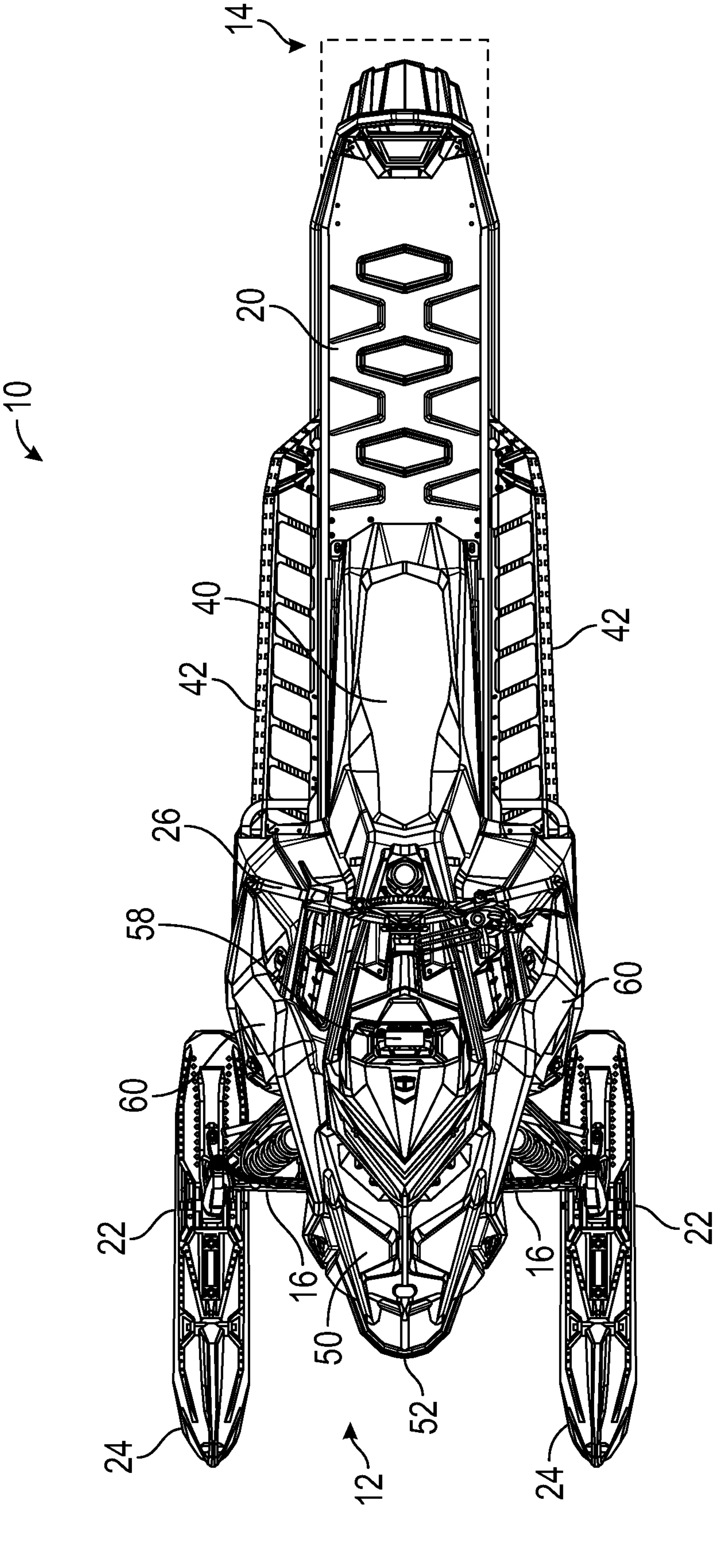
FIG. 5 is a top view of the snowmobile of FIG. 1.
Figure 6:
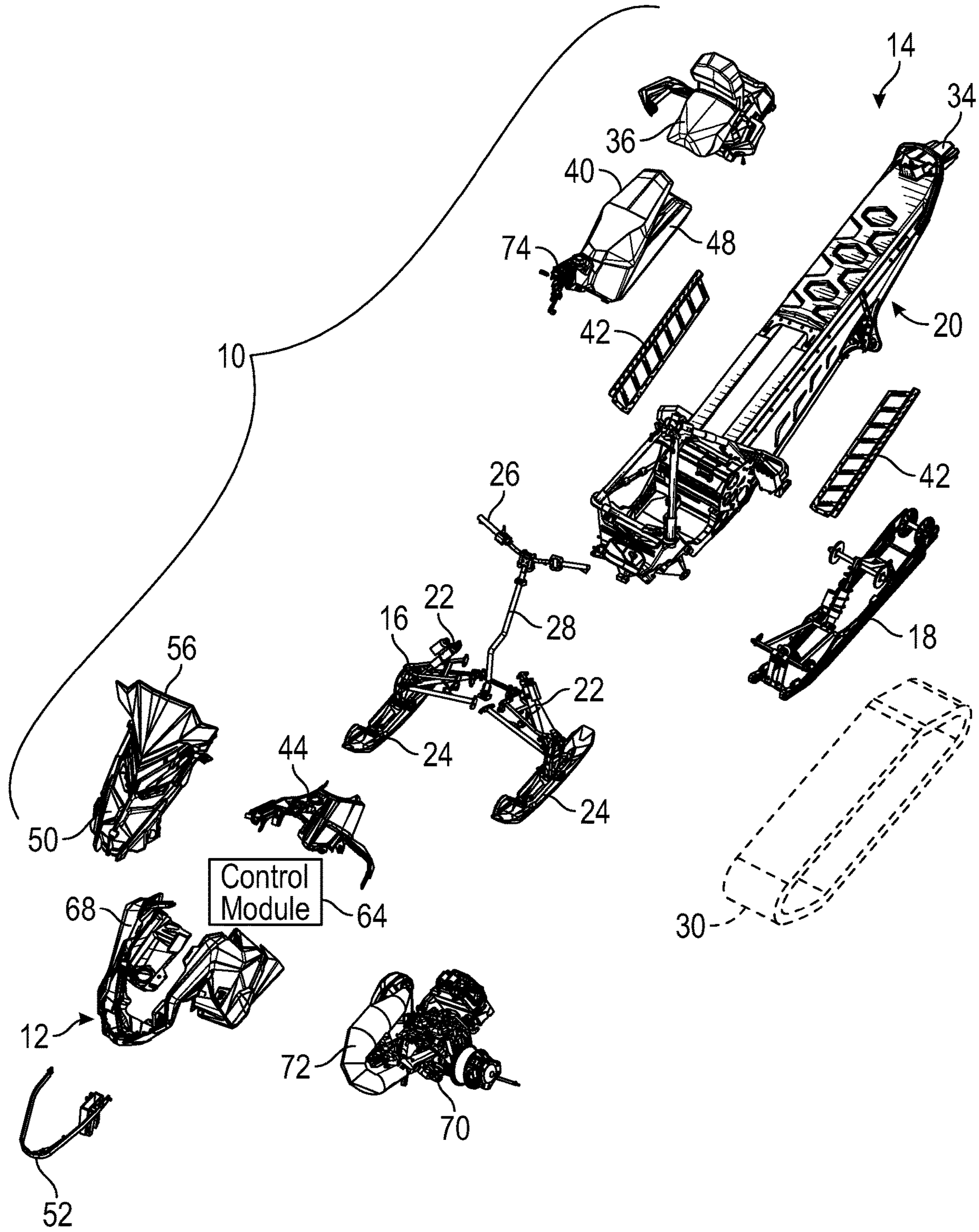
FIG. 6 is an exploded view of the snowmobile of FIG. 1.
Figure 7:
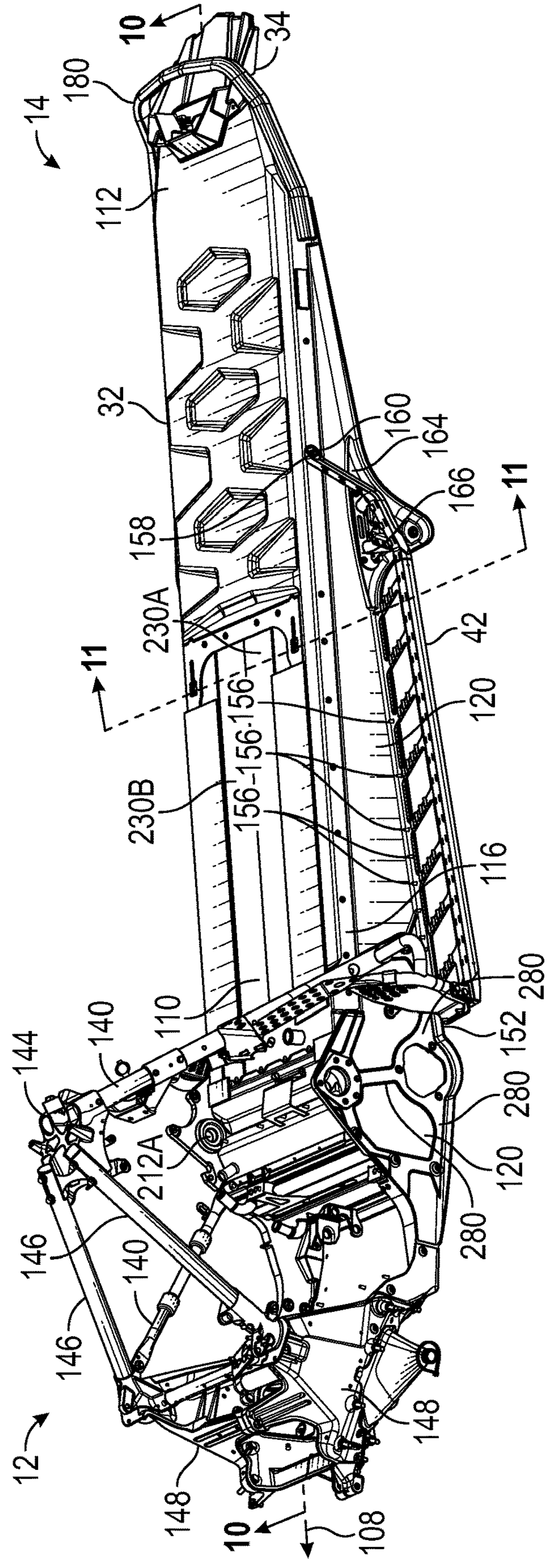
FIG. 7 is a left side perspective view of the tunnel coupled to structural members.
Figure 8:
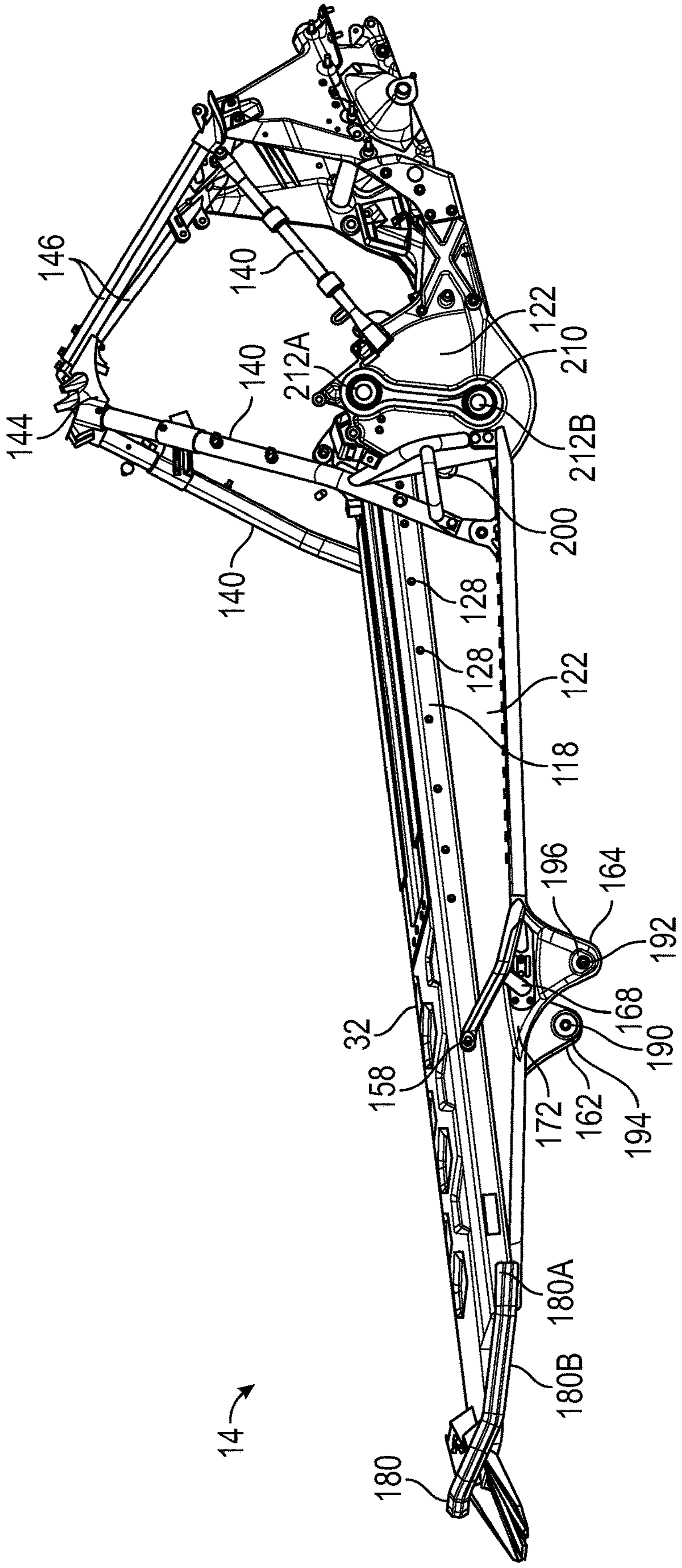
FIG. 8 is a right side perspective view of the tunnel of FIG. 7.
Figure 9:
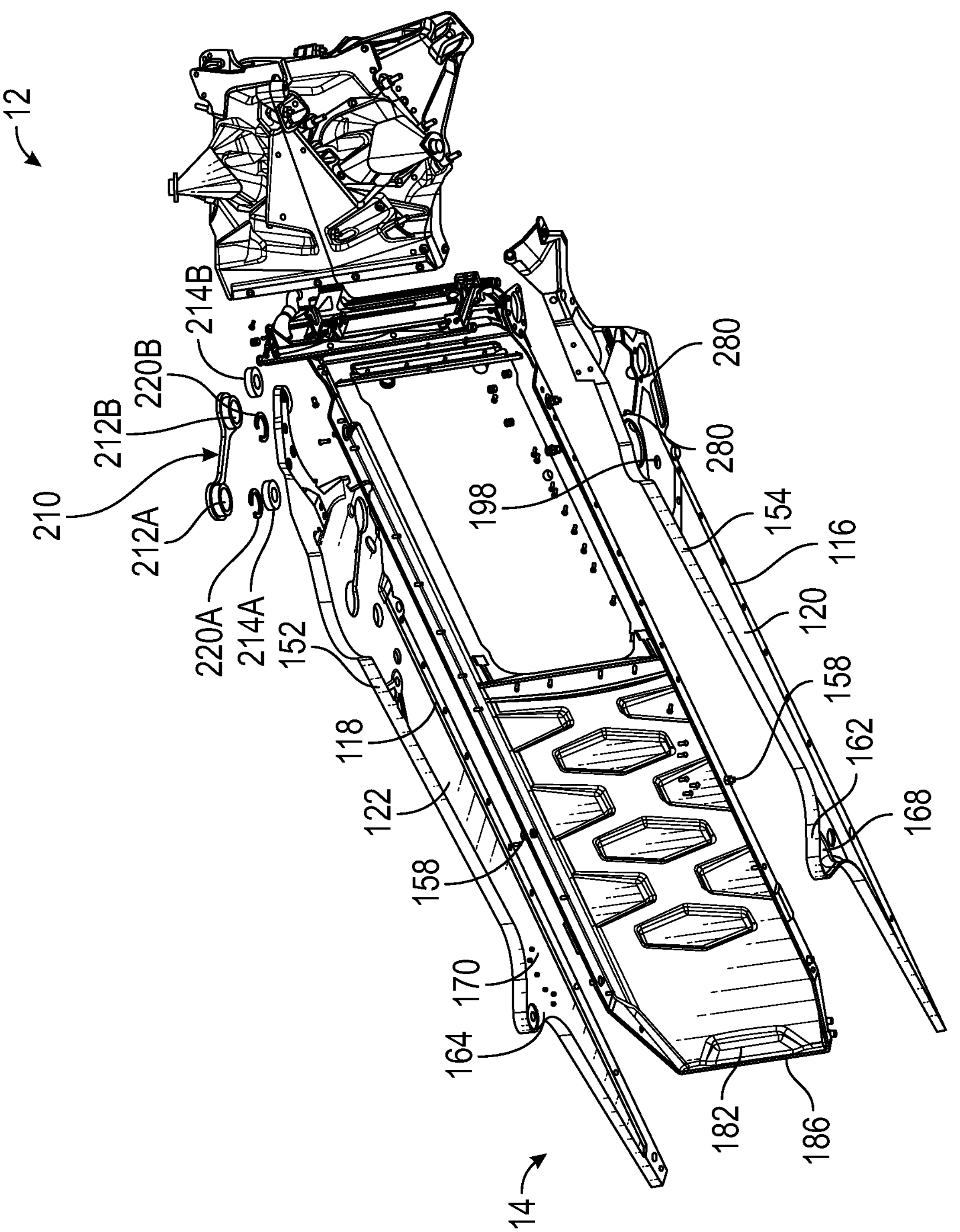
FIG. 9 is a partially exploded bottom view of the tunnel of FIG. 7.

With particular reference to FIG. 6, the snowmobile 10 further includes an engine assembly 70. The engine assembly 70 generates power for driving the track 30. The engine assembly 70 may include any suitable engine, such as an electric, 2-stroke, and 4-stroke engine. Coupled to the engine assembly 70 is an exhaust assembly 72. Any suitable exhaust assembly may be used. Oil for the engine assembly 70 is stored in an oil tank assembly 74, which may be arranged proximate to the seat 40.

The snowmobile 10 further includes any suitable control module 64. The control module 64 may be arranged at any suitable location, such as within the hood assembly 50, beneath the center console 44, or within any suitable control mounted to the handlebars 26. The term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Referring to FIGS. 7-27, the tunnel 32 is illustrated in various perspective views. In the following description, the tunnel 32 is a multi-piece tunnel that is formed from but not limited to sheet molded composite such as carbon fiber. Of course, other types of materials may be used. By allowing materials that may be molded, the wall thickness may be varied in locations that are desired to be reinforced. Overmolding of dissimilar material components, for example metal, within the composite material forming the tunnel is also possible. The tunnel 32 extends along a longitudinal axis 108 from a first proximal end 110 to a second distal end 112. The tunnel 32 has an overall length of about 1733 mm, with a range of lengths between about 1733 mm to about 2100 mm. The tunnel 32 includes an upper substantially planar or top plate 114 bounded by the first proximal end 110 and the opposed second distal end 112. A first side flange 116 and an opposed second side flange 118. Extending at about 90° from the top plate 114 is a first tapered sidewall 120. Extending vertically from the second sidewall 118 is a second tapered sidewall 122. A slight angle of about plus or minus 3 degrees is also possible. In one example, the walls are disposed outward several degrees. The tunnel 32 is shaped to substantially cover the track 30 and support the seat 40 and fuel tank 48. The top plate 114 and the sidewalls 120 and 122 can be formed separately and attached to one another, such as by welding, riveting, fasteners, adhesives, etc. Alternatively, the tunnel 32 can be bent or shaped to form an integral one-piece construct.

Figure 11:
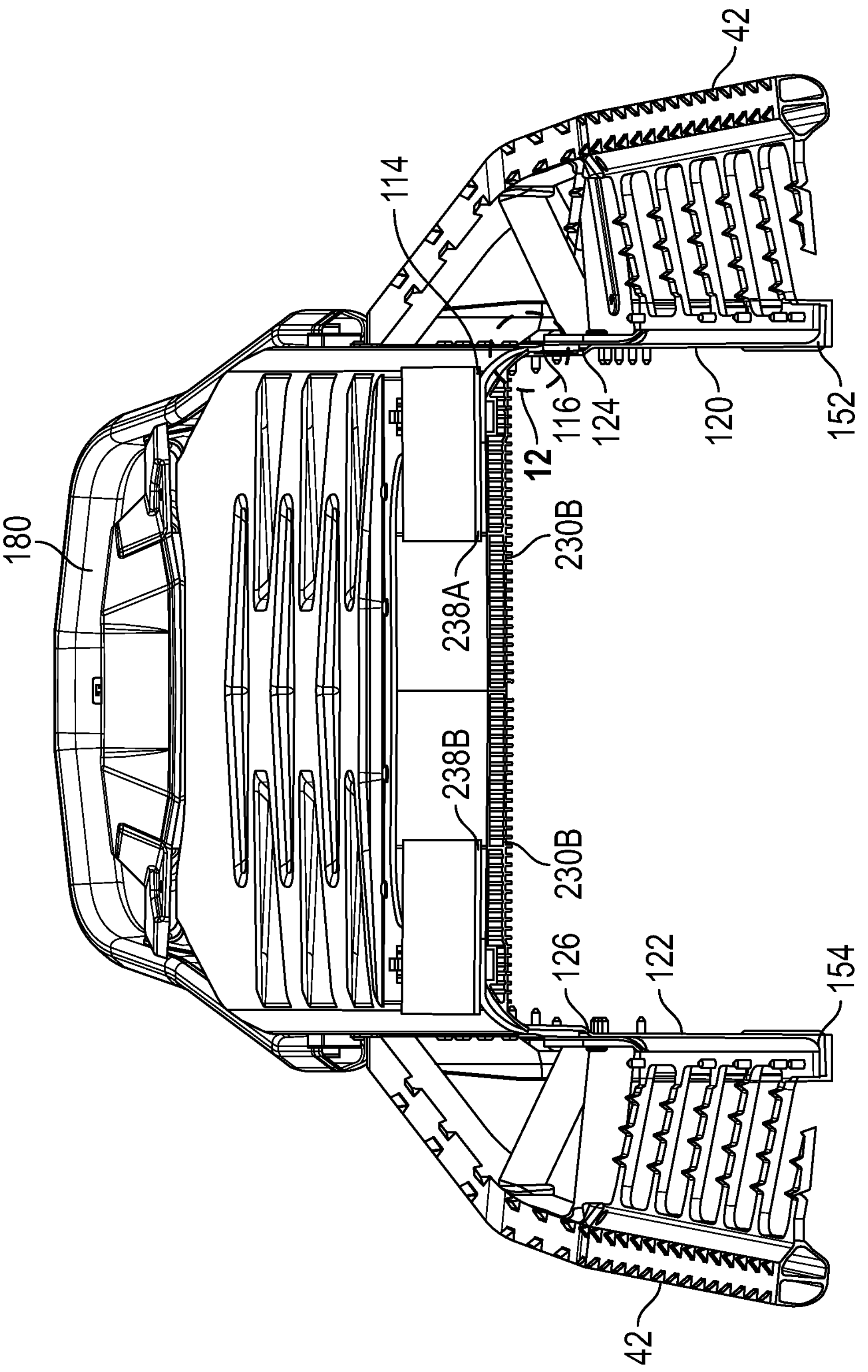
FIG. 11 is a lateral cross-sectional view of the tunnel of FIG. 7.
Figure 12:
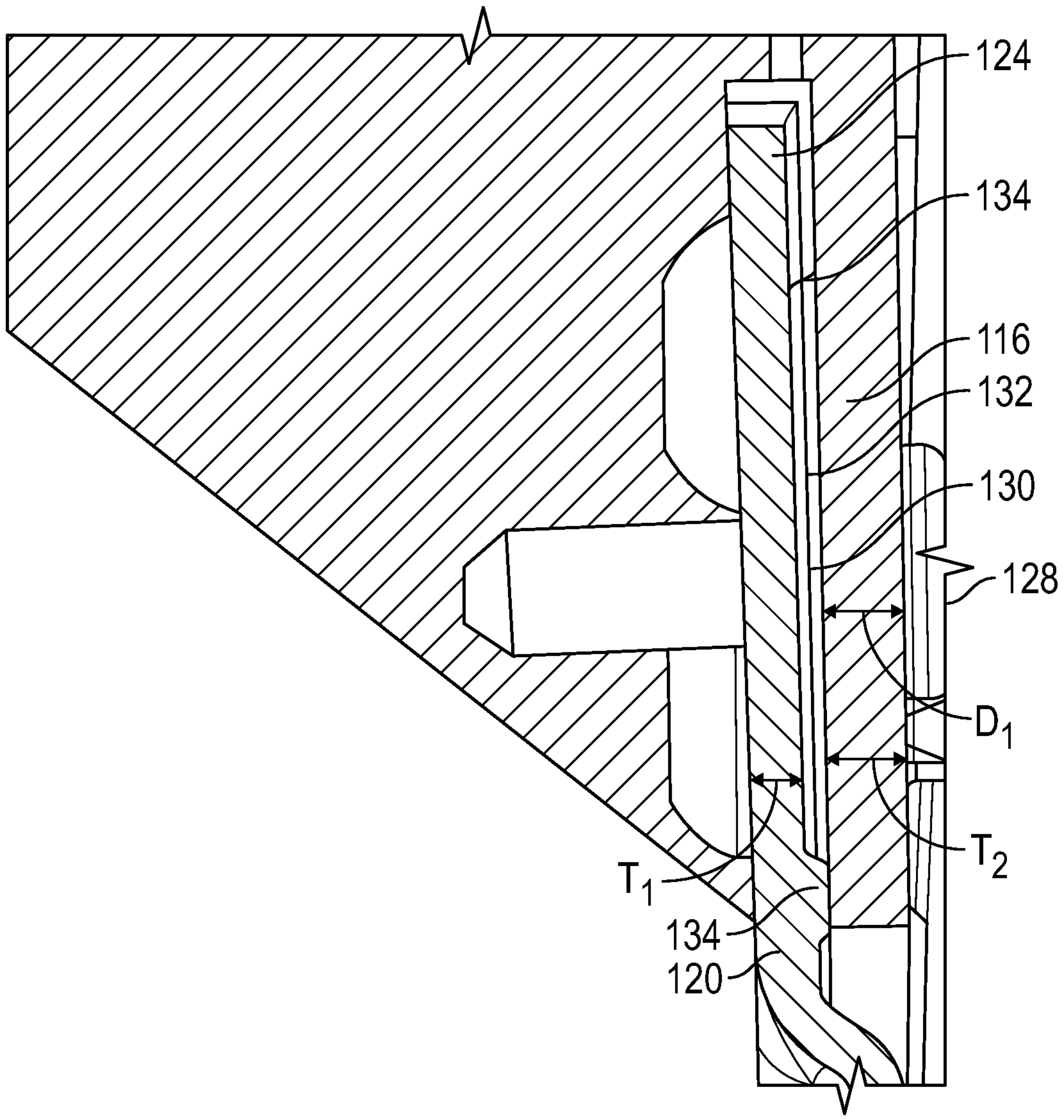
FIG. 12 is an enlarged cross-sectional view of a portion of FIG. 11.
Figure 13:
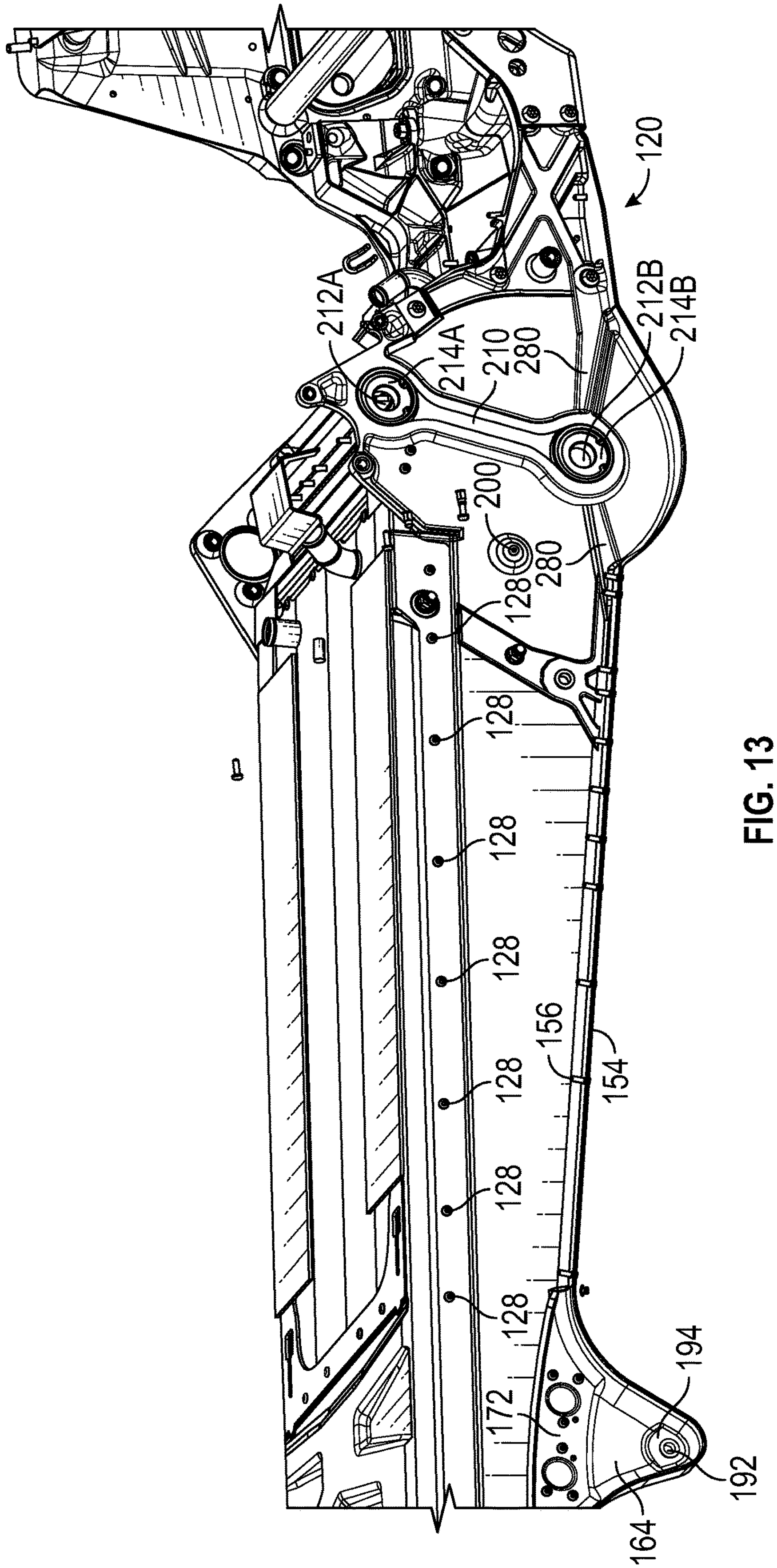
FIG. 13 is right side view of a longitudinal cross section.
Figure 14:
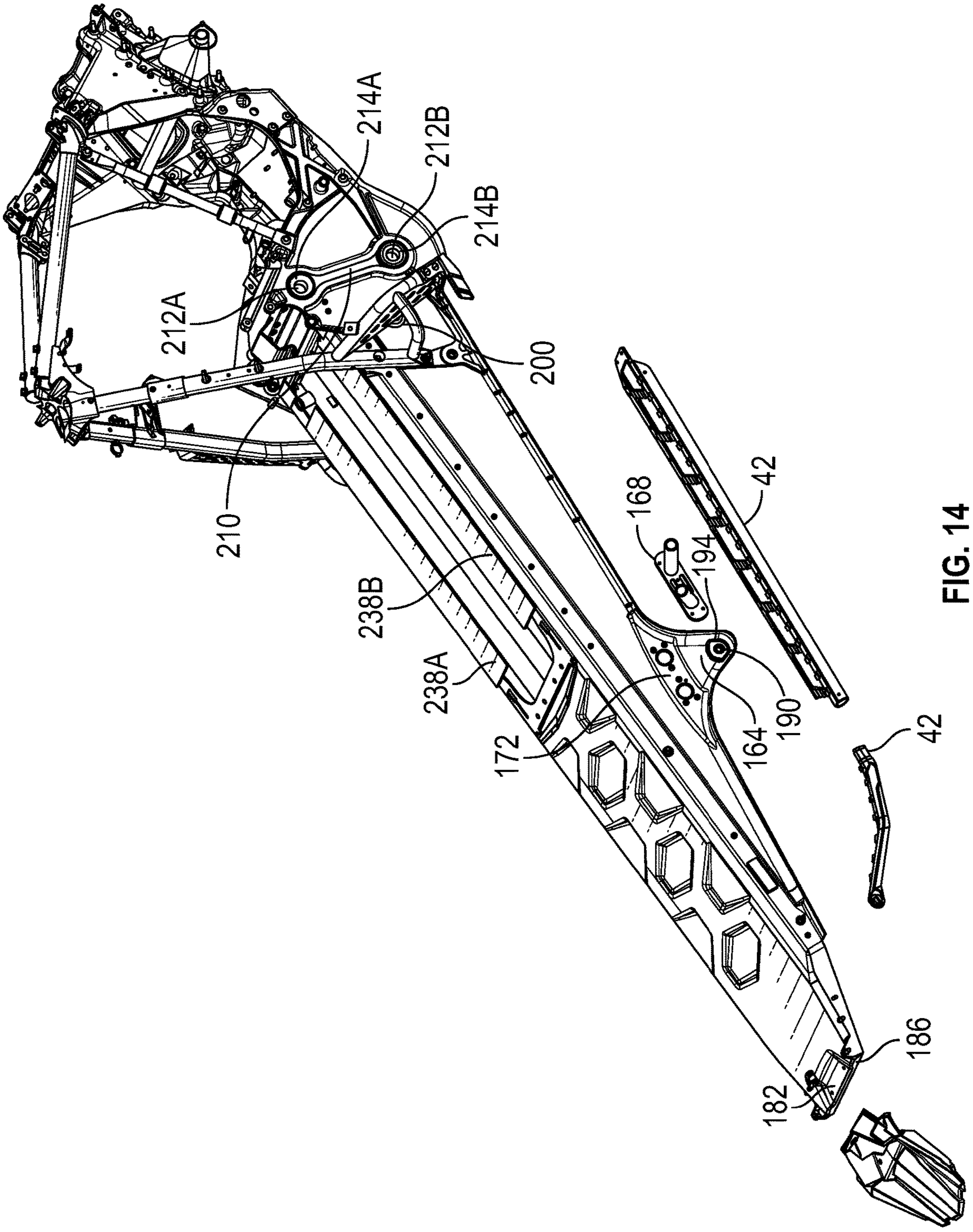
FIG. 14 is a partially exploded view of the running boards relative to the tunnel.
Figure 15:
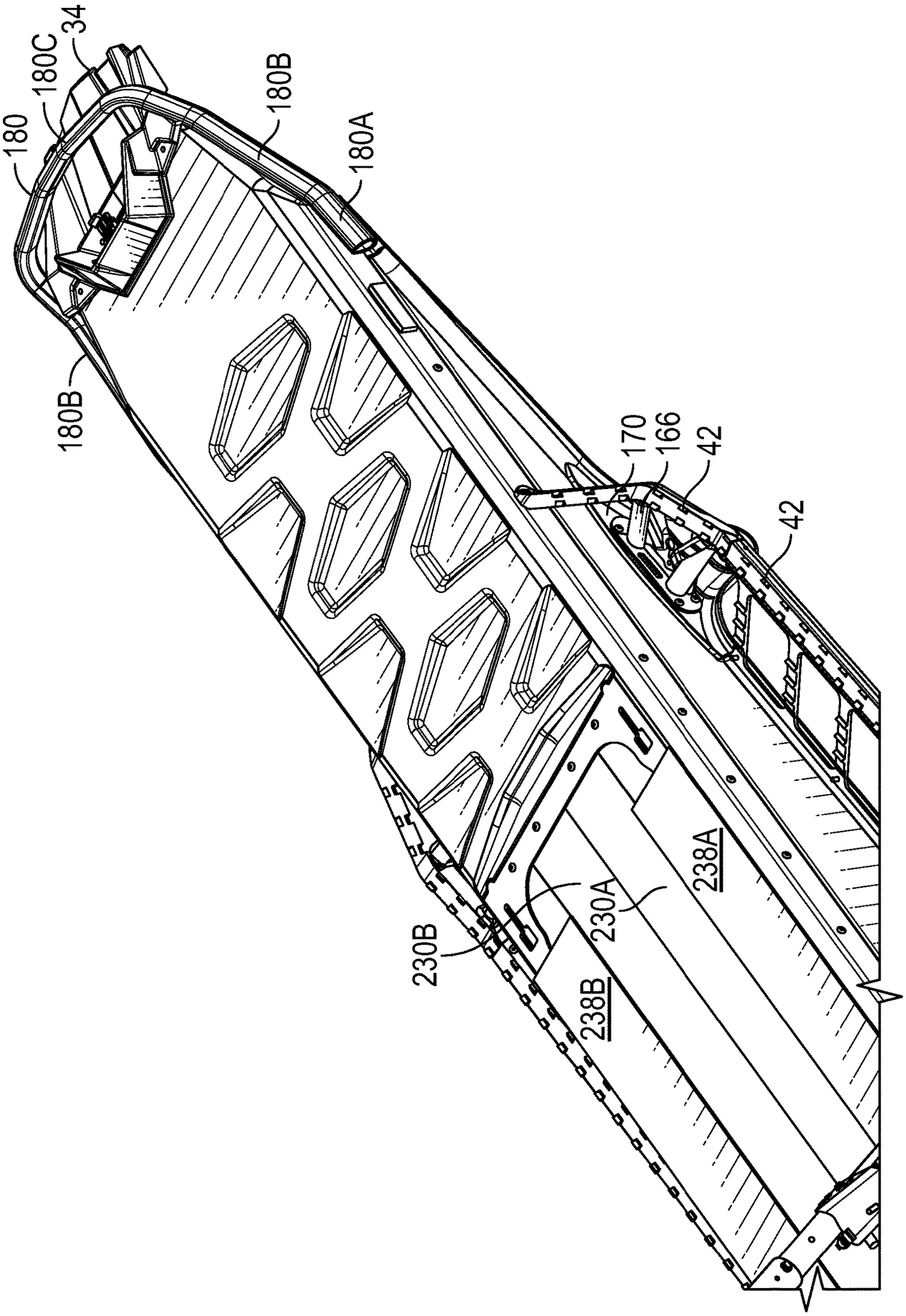
FIG. 15 is left side view of the mounting brackets for the running board.
Figure 16:
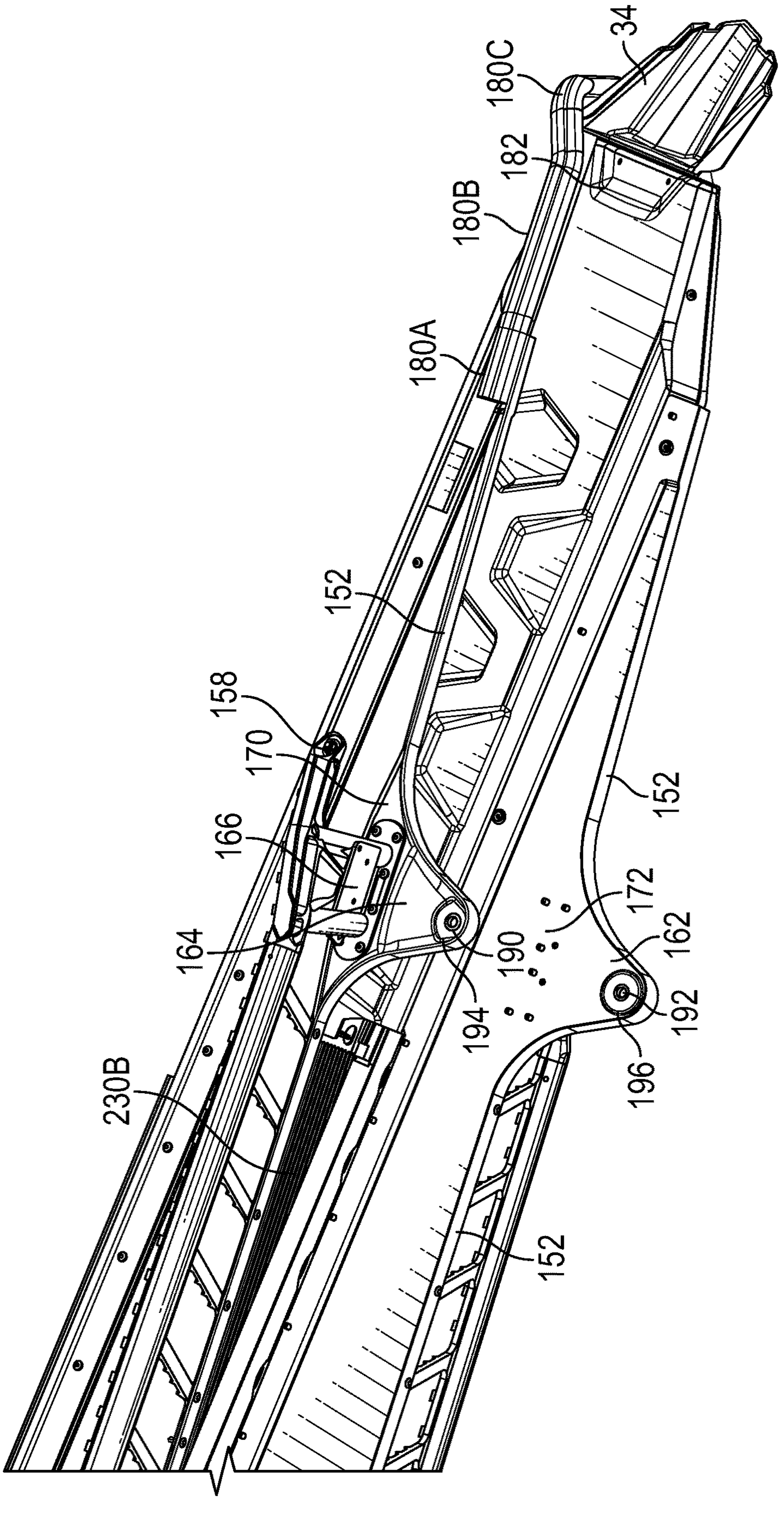
FIG. 16 is a partial underside perspective view of the tunnel.
Figure 17:
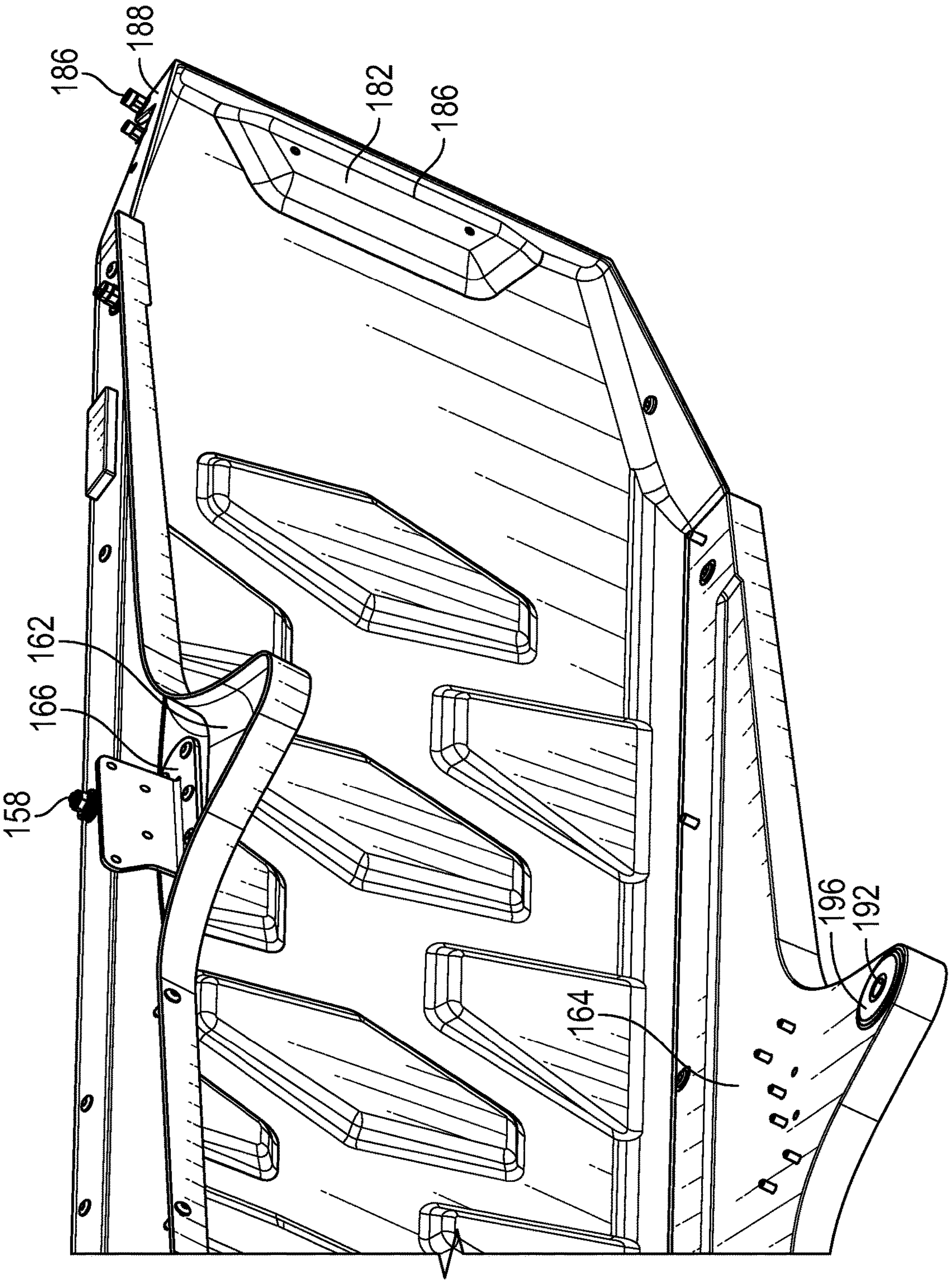
FIG. 17 is an enlarged underside perspective view of the distal end of the tunnel.
Figure 18:
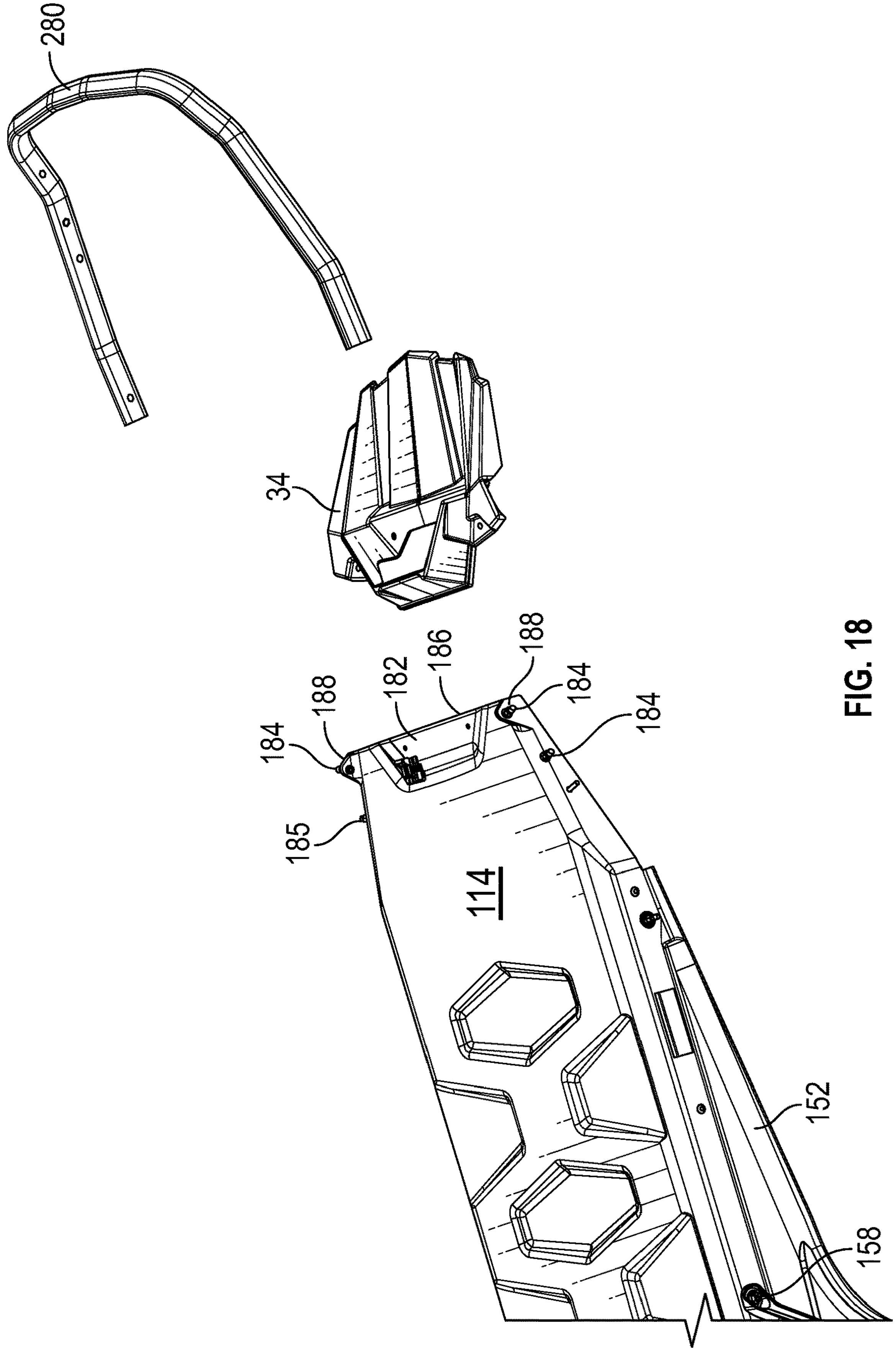
FIG. 18 is a top partially explodes view of the tunnel and the bumper.
Figure 20:
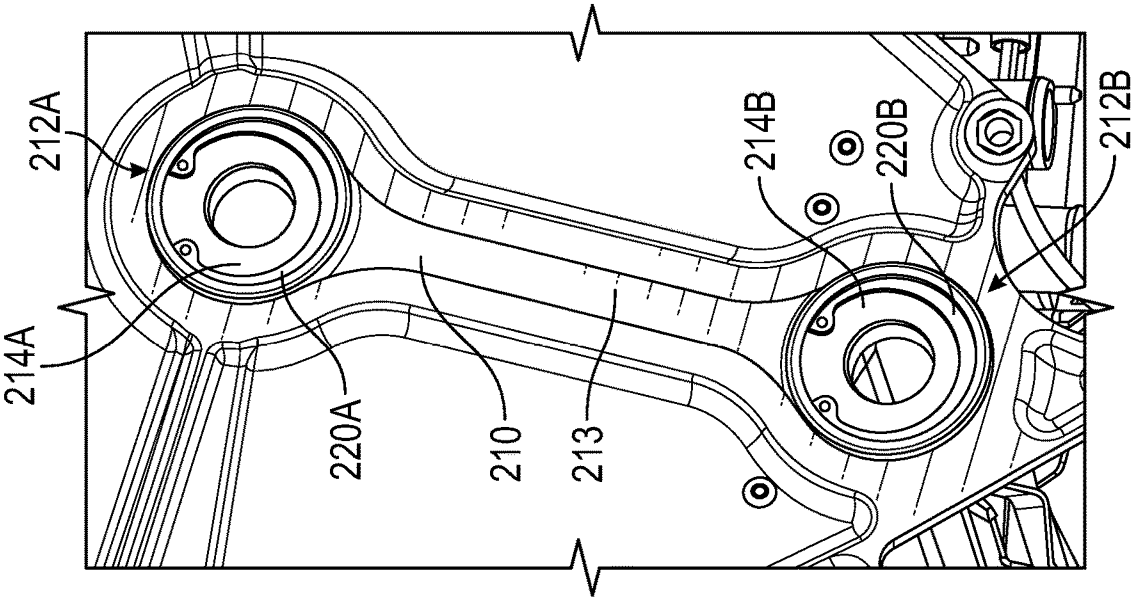
FIG. 20 is an enlarged left side view of the bearing carrier within the tunnel
Figure 19:
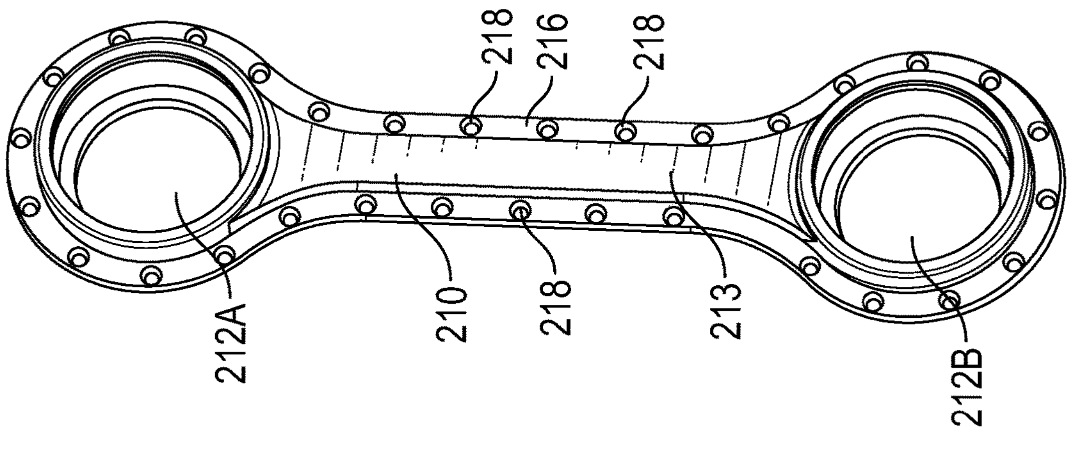
FIG. 19 is a perspective view of the bearing carrier 210.

As is best illustrated in the cross-sectional views of FIGS. 11 and 12, the first sidewall 120 may have a first offset portion 124 and the second sidewall 122 may have a second offset portion 126. In general, the first sidewall 120 and the second sidewall 122 are generally planar. The first offset portion 124 and the second offset portion 126 are offset a distance D1 inward relative to the vehicle to receive the thickness of the first side flange 116 and the second side flange 118 respectively. In this example, the outer surfaces of the first side flange 116 and the second side flange 118 are coplanar with the first sidewall 120 and the second sidewall 122, respectively.

In this example, the first side flange 116 and the second side flange 118 are coupled to the respective first offset portion 124 and the second offset portion 126 with a rivet 128. Of course, other types of fasteners may be used. Likewise, the fasteners may be eliminated with the use of adhesive 130, a portion of which is illustrated. The adhesive 130 may be disposed within a channel 132 that is formed between the respective offset portion 124, 126 and the respective first side flange 116 and the second side flange 118. A spacer 134 extends laterally from one of the first side flange 116, second side flange 118, the first offset portion 124 and the second offset portion 126. In this example, the spacer 134 extend lateral (relative to the vehicle) outward from the first offset portion 124 and the second offset portion 126. It should be noted that one or both offset portions 124, 126 may be formed on the edge as well. Of course, more than two spacers 134 may be used. The spacers 134 allow a sufficient amount of adhesive to be used to join the first side flange 116 and the first sidewall 120 as well as the second side flange 118 and the second sidewall 122. The first sidewall 120 and the second sidewall 122 may have a primary thickness such as 2 mm. However, curved portions and reinforcement areas may have a second thickness such as 3 mm. In this example, the first sidewall 120 and the second sidewall 122 have a thickness T1 such as 2 mm (primary or nominal thickness) while the side flanges 116, 118 have a thickness T2 such as 3 mm (secondary thickness). The total secondary thickness area of the tunnel 32 is less than the area of primary thickness, in this example. In other examples, the thicknesses T1 and T2 can be reversed.

Figure 10:
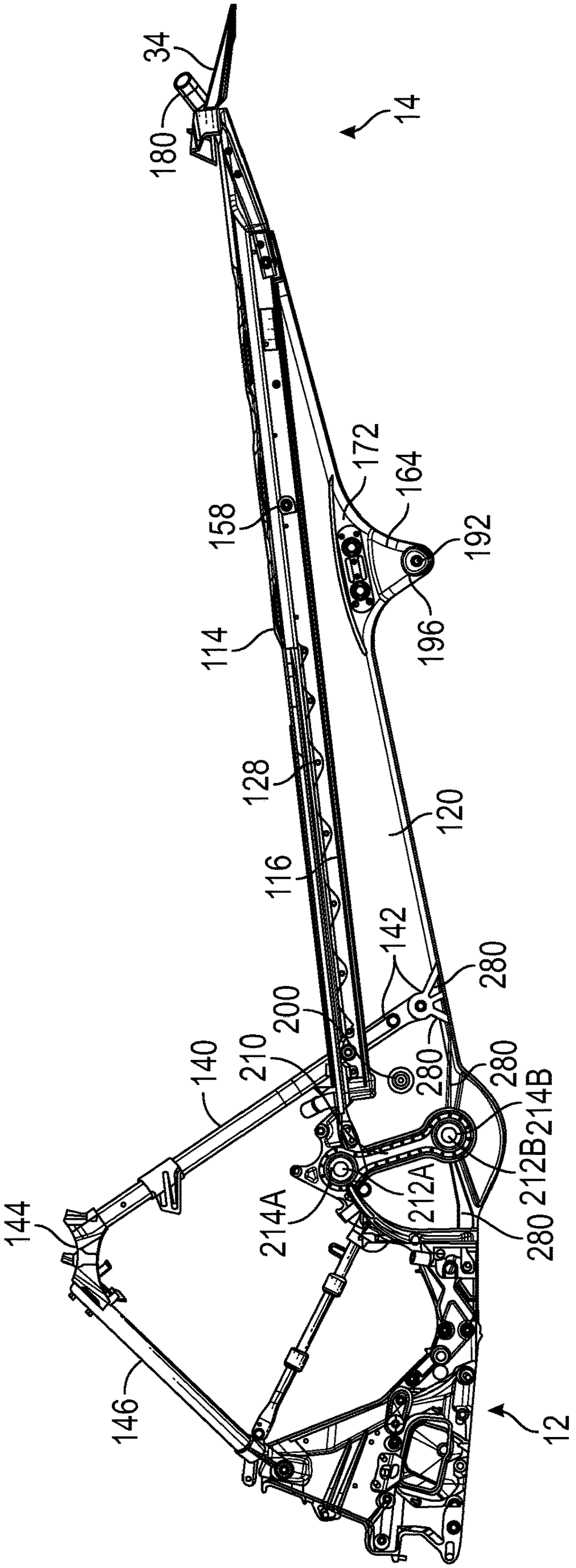
FIG. 10 is a longitudinal cross-sectional view of the tunnel of FIG. 7.

The tunnel 32 may also be used for coupling structural members 140 thereto. The structural members 140 may be mounted to a reinforcement area 142 on the sidewalls 120. This is best illustrated in FIG. 10. The reinforcement area 142 may be an area of secondary thickness such as 3 mm as opposed to the primary thickness of the sidewalls 120, 122.

The structural members 140 of the chassis 20 may be joined at a joiner 144. The joiner 144 may also be coupled to forward structural members 146. Front cross members are used to couple to the forward structural members 146 and to the front end 12 of the tunnel 32. As will be described in further detail below, the front portions of the sidewalls 120, 122 and the intersection of the front cross members 148 may have an engine mount disposed therein.

The first sidewall 120 has a lower flange 152 and the second sidewall 122 has a lower flange 154. The lower flanges 152, 154 extend laterally outward from the respective sidewalls 120, 122. The lower flanges 152, 154 may be formed of the same material and molded simultaneously with the sidewalls 120, 122. The lower flanges 152, 154 may be the secondary thickness such as 3 mm. The running boards 42 are attached to the lower flanges 152, 154 of the respective sidewalls 120, 122. In this example, the running boards 142 are disposed on top of the lower flanges 152, 154. Fasteners, such as rivets 156, are used to secure the running boards 42 to the respective lower flanges 152, 154.

The running boards 42 may also be attached to the first side flange 116 and the second side flange 118 at the running board mounting position 158. The running board mounting position 158 of the flanges 116, 118 may be the secondary thickness there around. The running board mounting position 158 may extend into the first offset 124 and the second offset 126. That is, the running board mounting position 158 may include the fastener 128 that extends through the first offset portion 124 and the respective first side flange 116 while the second offset portion 126 and the second side flange 118 may be joined together with a fastener 128. The first sidewall 120 and the second sidewall 122 may each contain a downwardly extending mount 162, 164. The downwardly extending mounts 162, 164 may receive running board brackets 166, 168 that are disposed in mounting areas 170, 172, respectively.

A bumper 180 is secured to the tunnel 32. In this example, the bumper 180 is U-shaped. The U-shaped bumper has a pair of first portions 180A that are forwardmost in the bumper 180. The forwardmost portions are coupled to an angled portion 180B which, in turn, is coupled to a lateral portion 180C. A lateral portion 180C extends over the flap 34. The distal end 14 of the tunnel 32 may have recess 182 for receiving the flap 34. The recess 182 extends downward relative to vehicle and receives at least a portion of the flap 34. The bumper 180 may be formed of a singular piece or multiple pieces. The bumper 180 is coupled to the tunnel 32 with fasteners 184.

A lateral wall 186 extends laterally across the width of the tunnel 32 and, in particular, the top plate 114 of the tunnel 32. It should be noted that the flap 34 may include a rear brake light and running light. The lateral wall 186 may be the primary thickness such as 2 mm or may be the secondary thickness of the tunnel 32 to provide extra rigidity. A bumper mount 188 extending in an upward direction relative to the vehicle may receive fasteners 184 for securing at least a portion of the bumper 180.

The mounts 162, 164 may include torque arm mounts 190, 192. The torque arm mounts 190, 192 may be mounted at the rear mounting area 194, 196, respectively which may be the secondary thickness of the molded tunnel material. The torque arm mounts 190, 192 may be used for receiving a torque arm that is ultimately coupled to the remaining portion of the suspension that couples the track to the vehicle. The torque arm is illustrated as reference numeral 29 in FIG. 1. A front torque arm mounting area 198 is disposed toward the front of the vehicle. The immediate area therearound may be the second thickness greater than the first thickness.

The front of the snow vehicle 10 has a first side brace portion 202 and a second side brace portion 204. The side brace portions 202, 204 are integrally formed with the front first sidewall 120 and the second sidewall 122. In prior snow vehicles the side braces are completely separate pieces.

As is best illustrated in FIGS. 8, 9, 10, 13 and 20, a bearing carrier 210 may be integral formed in a front portion of the second sidewall 122. The bearing carrier 210 may be formed of a different material than that of the sidewalls. For example, the bearing carrier 210 may be formed of metal. The metal of the barrier 210 may have a lower coefficient expansion than the material of the sidewalls and the top plate. The bearing carrier 210 has a first bearing receiver 212A and a second bearing receiver 212B. A bearing 214A and a bearing 214B are located in respective bearing receivers 212A, 212B.

The bearing carrier 210 has one or more molding flanges 216. In this example, the molding flanges 216 extend around the periphery of the bearing carrier 210. The molding flanges 216 have molding holes 218 disposed therein. The molding holes 218 allow molding material to be molded. That is, the bearing carrier 210 may be overmolded into the second sidewall 122. The molding holes 218 allow the molding material to flow therein to secure the bearing carrier 210 within the second sidewall 122. Thus, the thickness of the composite material together with the thickness of the bearing carrier 210 and the molding flanges 216 are greater than the first primary thickness and the second thickness of the composite material.

The bearing 214A may receive the jackshaft of the engine. The bearing 214B may be used to receive the rotating shaft of the driveshaft.

Retainers 220A, 220B may respectively be used within the bearing receiver 212A, 212B, respectively, to retain the bearings 214A, 214B therein. As illustrated, the retainers 220A, 220B are C-clips.

Figure 21:
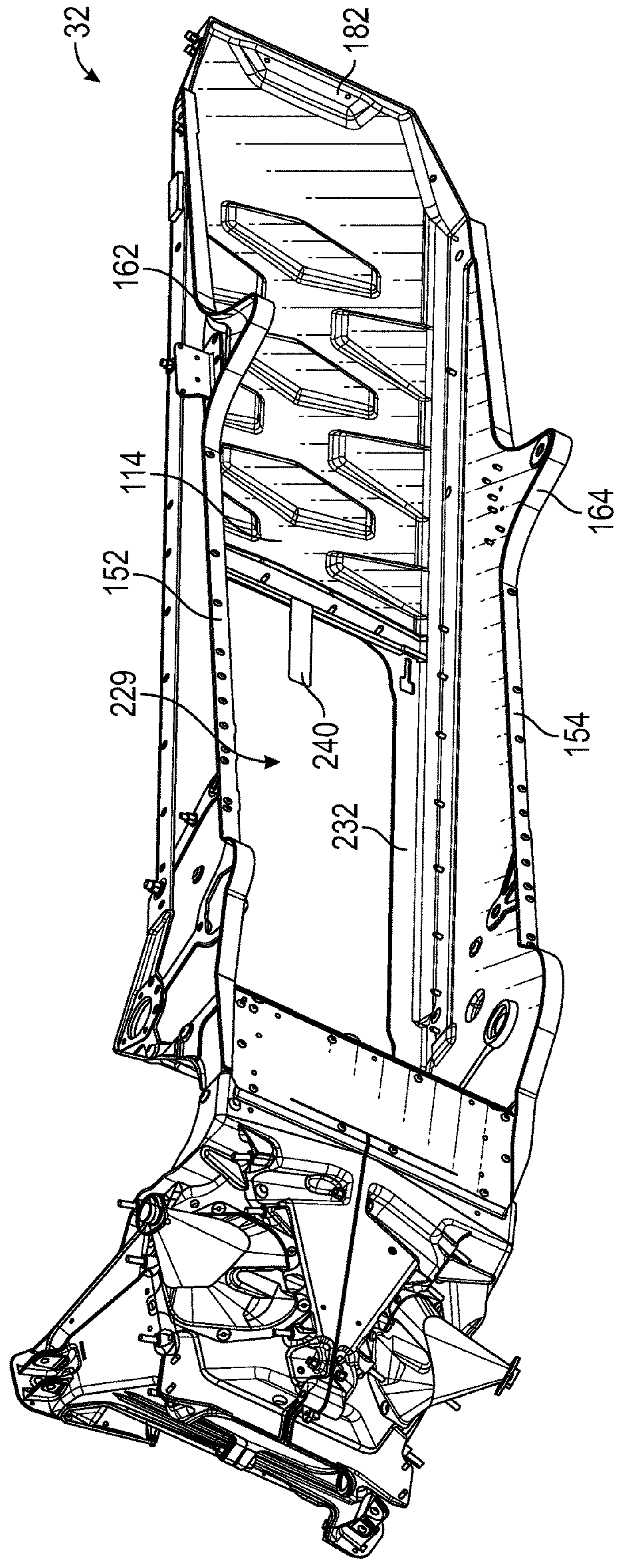
FIG. 21 is a partial underside perspective view showing the cooler opening of the top plate.
Figure 22:
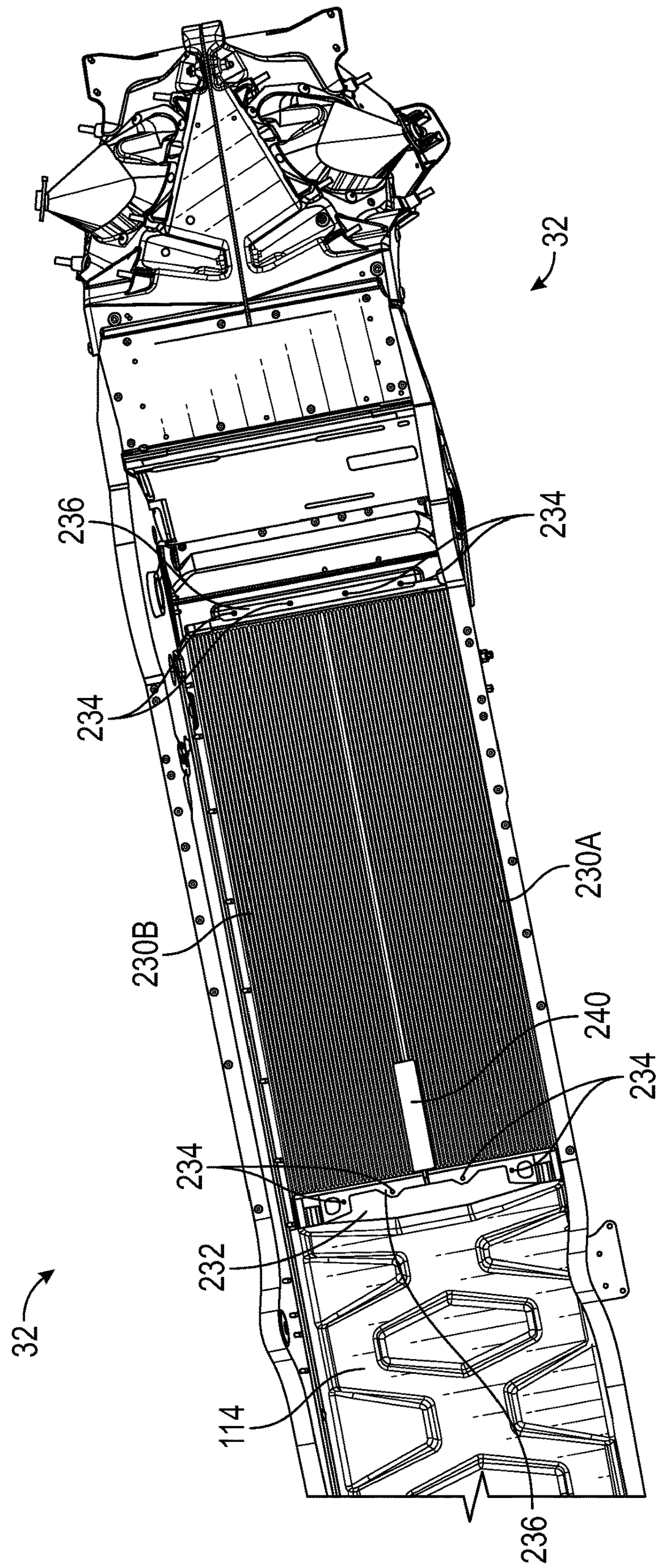
FIG. 22 is a bottom view of the coolers disposed in a top plate.
Figure 23:
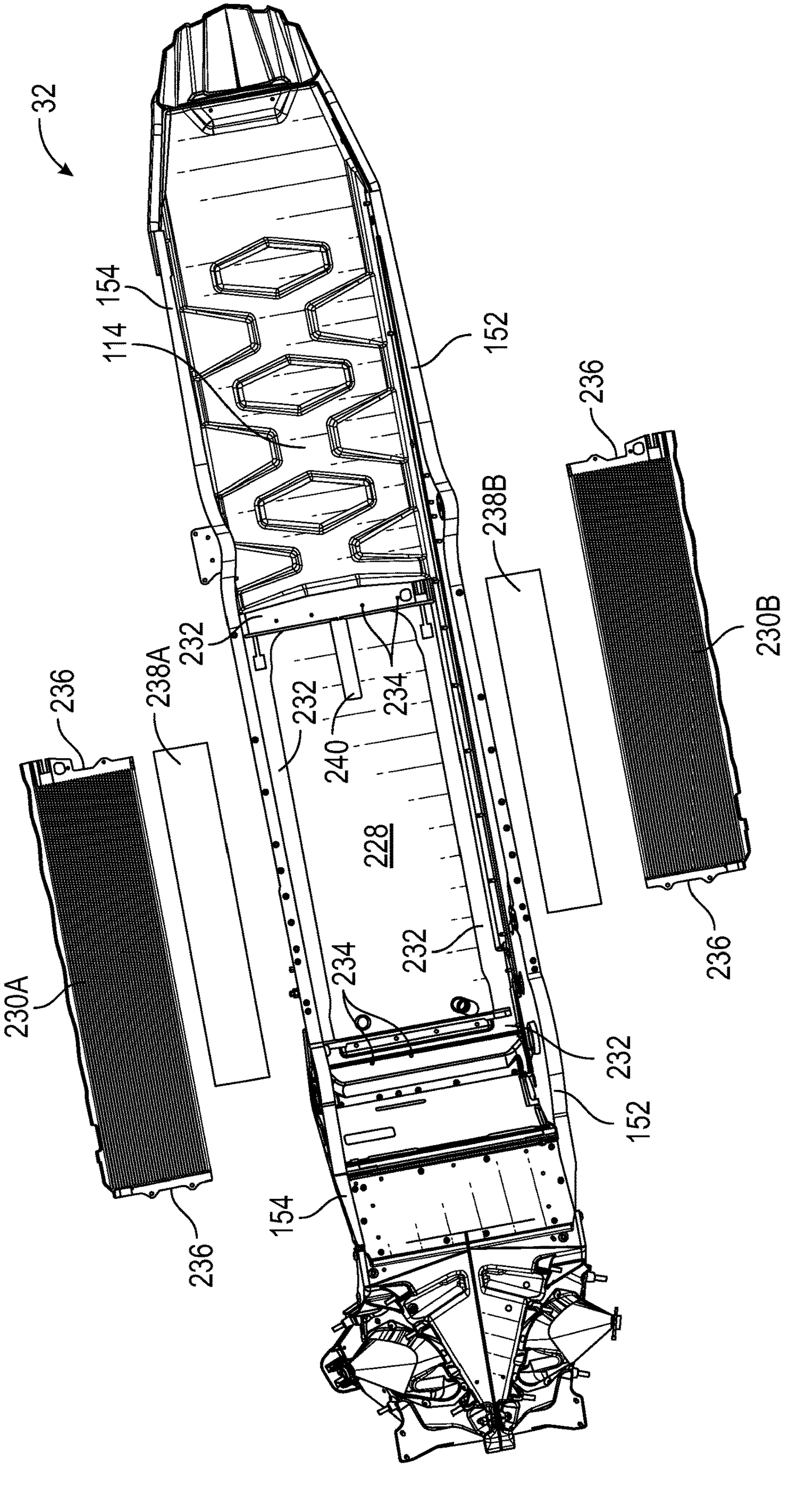
FIG. 23 is a partially exploded view of the coolers expanded from the top plate.
Figure 24:
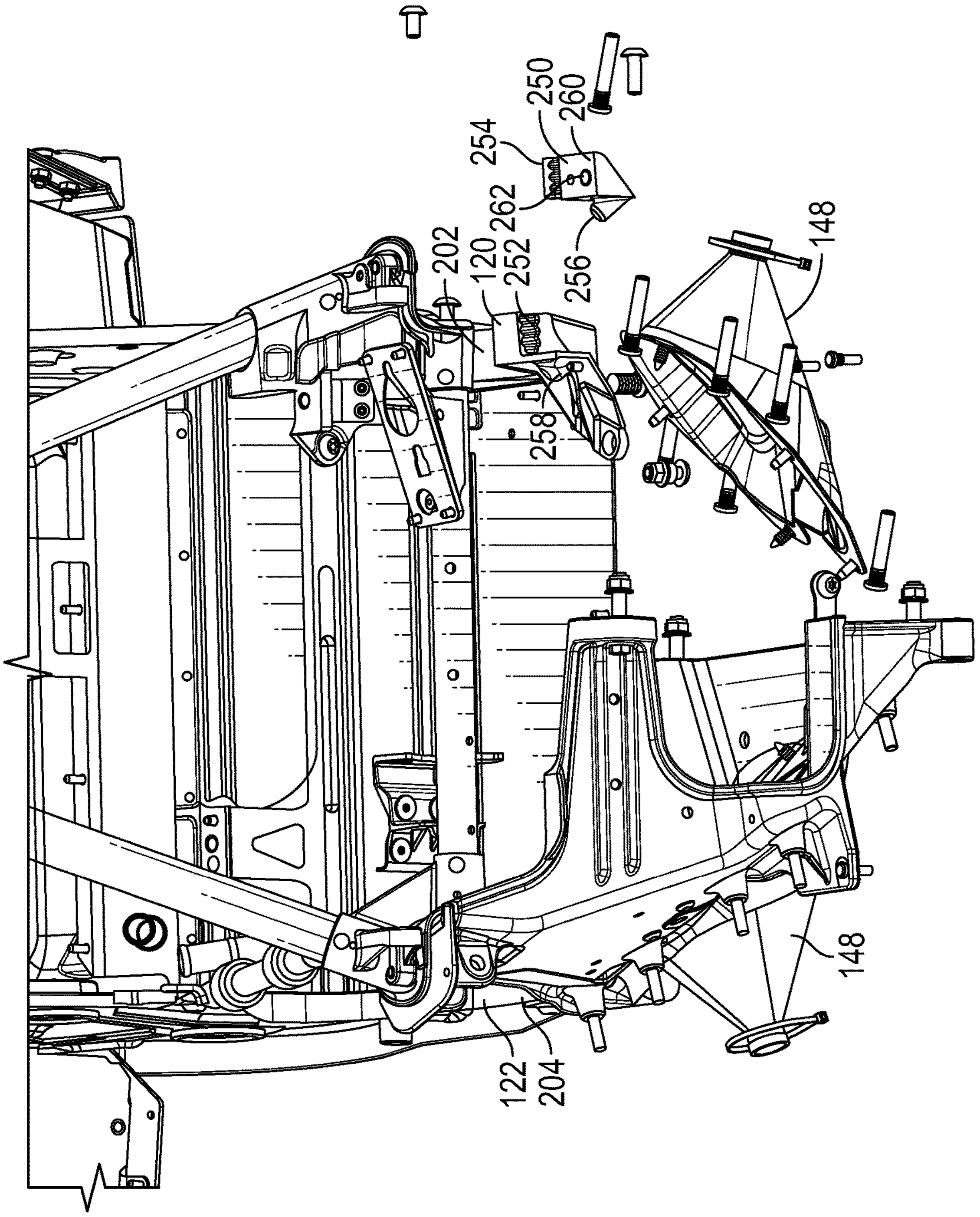
FIG. 24 is a partially exploded view of the engine mount coupled to the first sidewall.

Referring specifically now to FIGS. 21-23, the top plate 114 of the tunnel 32 has a cooler opening 228. The cooler opening 228, in this example, is rectangular. The cooler opening 228 is used to receive a cooler 230. In this example, a first cooler 230A and a second cooler 230B are set forth. The coolers 230A, 230B, together with the cooler opening 228, is rectangular. The cooler opening 228 may have a cooler opening reinforcement area 232 there around or at least partially there around. The cooler opening reinforcement area 232 may be an area with a thickness such as the secondary thickness such as 3 mm. Fasteners 234 may be used to couple end flanges 236 of the coolers 230A, 230B to the cooler opening reinforcement area 232.

A pad 238A and pad 238B may be located on the top surface of the top plate 114 of the tunnel 32 to protect the coolers 230A, 230B. The pads 238A and 238B may be formed of foam.

The front end 12 of the first sidewall 120 may be reinforced to receive an engine mount 250. The first sidewall 120 has a pocket 252. The pocket 252 laterally extends into the wall 120. The pocket 252 receives a tab 254 that has a wide portion 254A and a narrow portion 254B. A narrow portion 252B corresponds to the narrow portion 254B and a wide portion 252A of the pocket 252 corresponds to the wide portion 254A of the tab 254. A locator 256 of the engine mount 250 is located within a locator pocket 256 when assembled. The engine mount 250 may be made of a resilient material that is different than the material used to the form the sidewalls. The engine mount 250 may thus be used to damp vibration of the engine. The composite material may of the tunnel together with engine mounts may significantly reduce dampen vibration in the vehicle. Fasteners may be received within the holes 262 for mounting the engine to the engine mounts 250. Ribs 264 extend upward and downward from the engine mount 250 relative to vehicle. The ribs 264 may help retain the engine mount 250 within the pocket 252. Fasteners received within the holes 262 disposed on either side of the engine prevent the engine mount 250 from moving laterally outward from the pocket 252. It should be noted that although only one engine mount 250 is illustrated, more than one engine mount such as another engine mount on the other side of the vehicle may also be provided.

Figure 25:
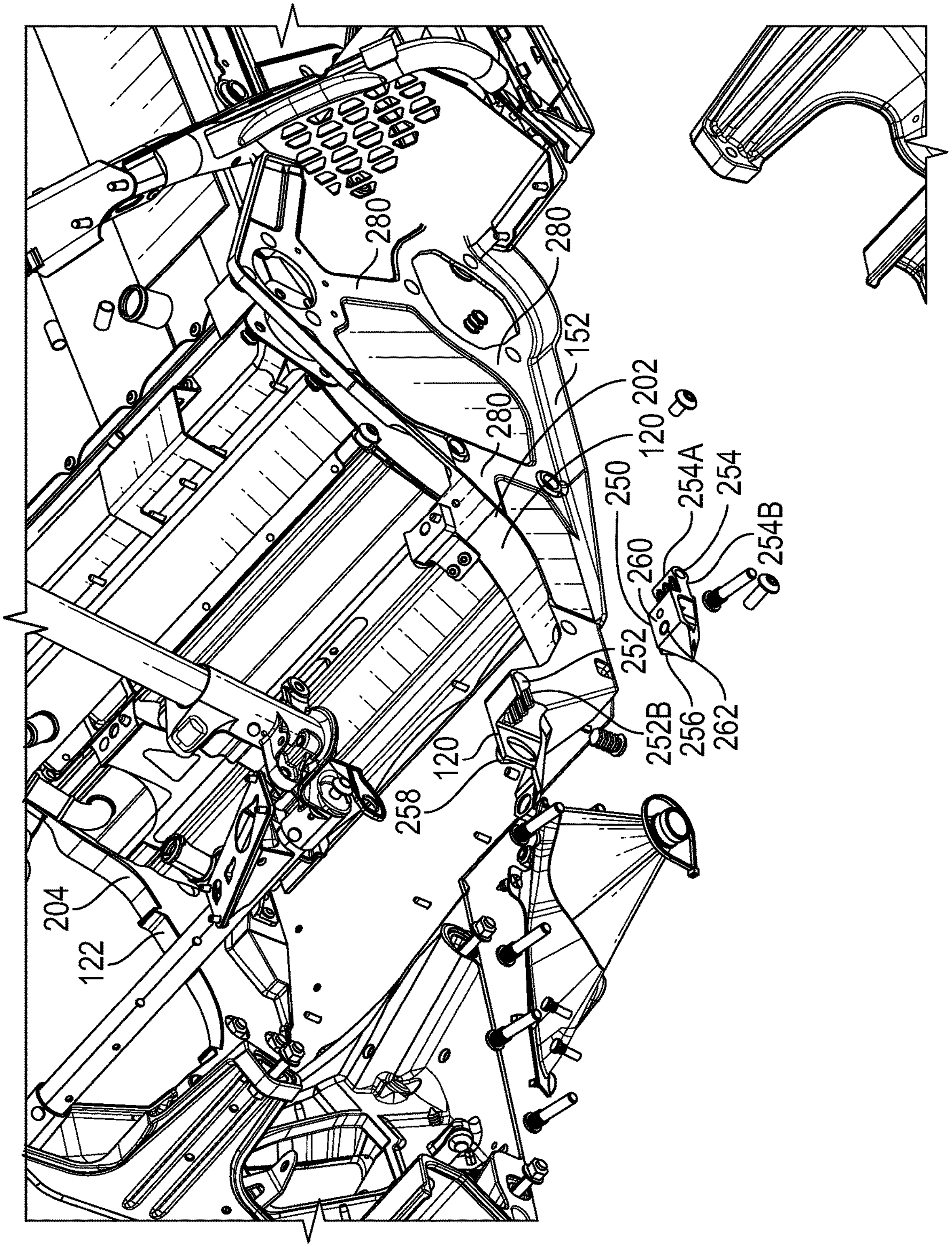
FIG. 25 is a partially exploded view of the engine mount relative to the sidewall.

By molding all or some of the components of the tunnel 32, various portions of strengthened composite material may be formed. Unidirectional tape may be molded into certain areas to increase the strength in a high stress area. In FIG. 25, the sidewall 120 reinforce ribs or areas 280. The reinforced ribs or areas 280 may extend vertical or angularly relative to the vehicle. The reinforced areas 280 may surround areas of high stress. Both the sidewalls 120, 122 as well as the top plate 114 may have reinforced areas 280. The reinforced areas may be a uniform thickness such as 3 mm while the primary thickness of the composite components is different such as 2 mm. The reinforced areas 280 may be positioned around where fasteners are used to secure other components to the vehicle. The reinforced areas 280 are selectively used so that the bulk of the area of the top plate 114 and the sidewalls 120, 122 are of the lesser primary thickness. This eliminates the use of doubling plates as was common in previously known tunnel designs. The reinforced areas 280 may extend to the sidewalls around the bearing retainer as well.

To form the tunnel 32, one or more of the top plate 114, the first sidewall 120 and the second sidewall 122 are molded of composite material. Each piece can be separately molded. The top plate has a first flange and a second flange extending from opposite edges of the top plate. A first adhesive channel is formed between the first sidewall and the first flange and a second adhesive channel is formed between a second flange and the second sidewall. Adhesive is applied in the in the first adhesive channel and the second adhesive channel. The first sidewall is affixed to the first flange and the second sidewall to the second flange from bonding of the adhesive. Fasteners may also be used to strengthen the connection between the flanges and the sidewalls. Fasteners fasten the first sidewall to the first flange and the second sidewall to the second flange.

Figure 26:
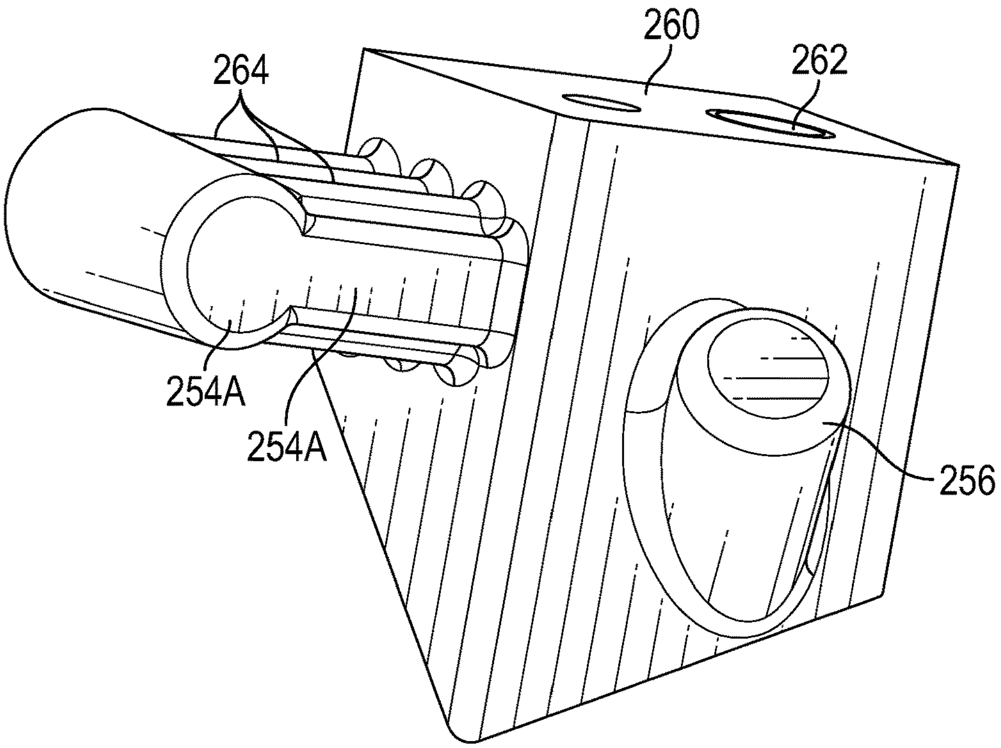
FIG. 26 is a left side view of the engine mount of FIGS. 25 and 26.
Figure 27:
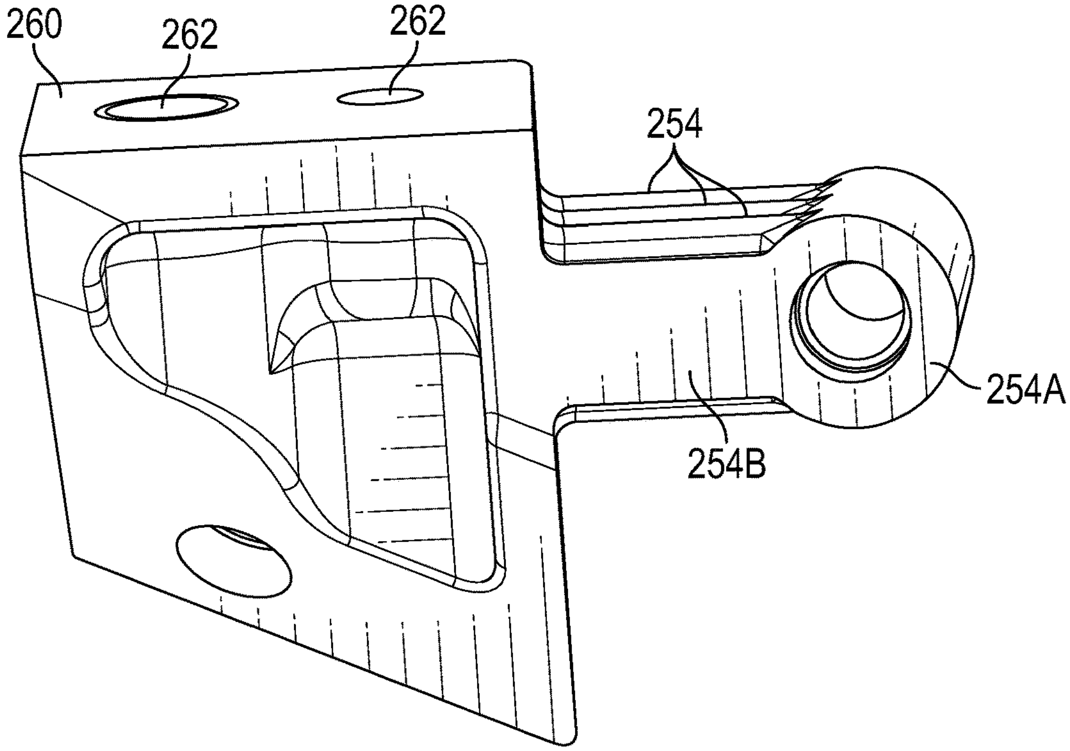
FIG. 27 is a right side perspective view of the engine mount of FIGS. 25-27.
Figure 28A:
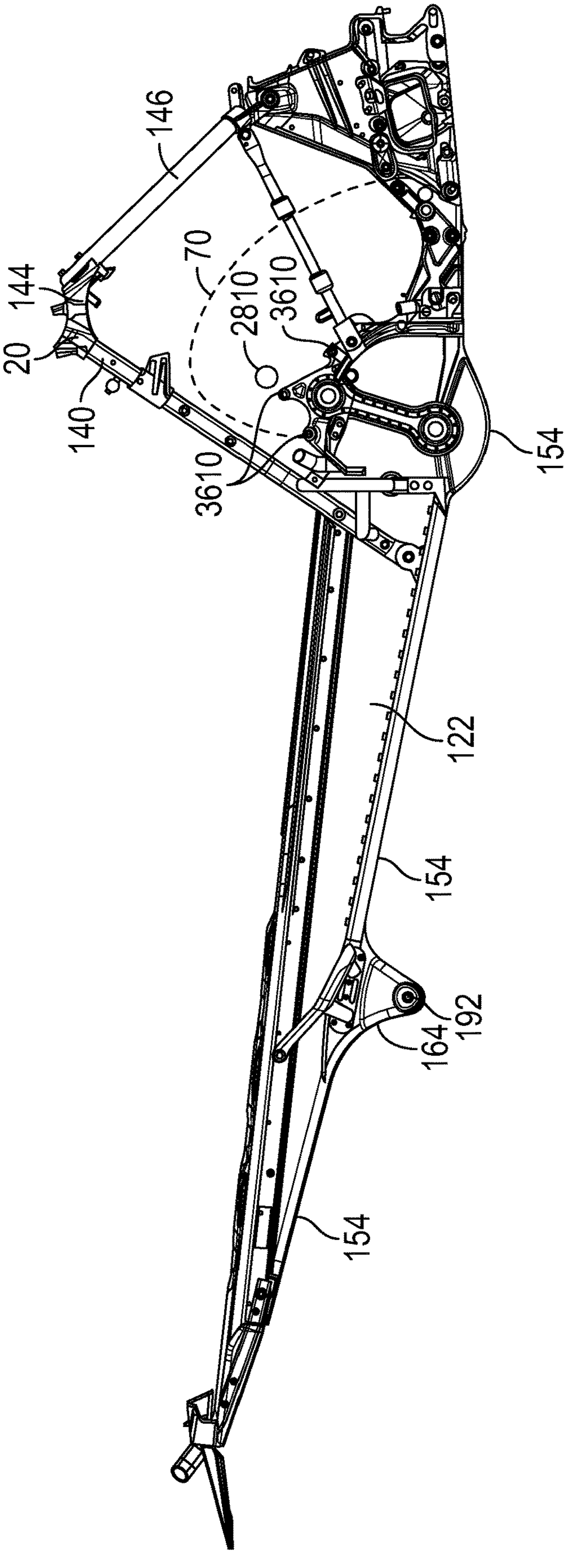
FIG. 28A is a right side view of the tunnel and chassis with the flange extending from the rearward portion behind the rear torque arm mount to in front of the crankshaft.
Figure 28B:
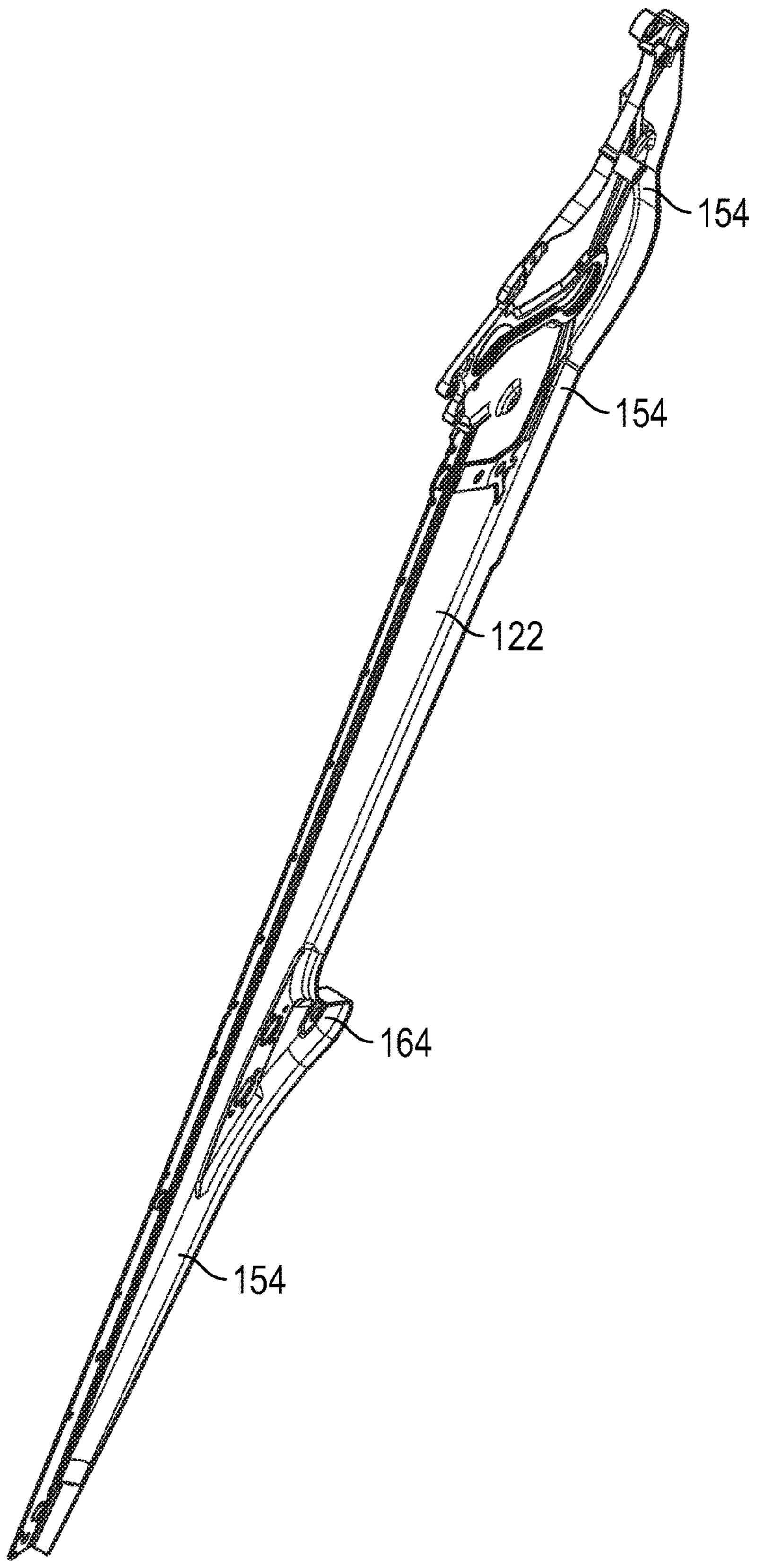
FIG. 28B is a perspective view of the right sidewall showing the right flange.
Figure 28C:
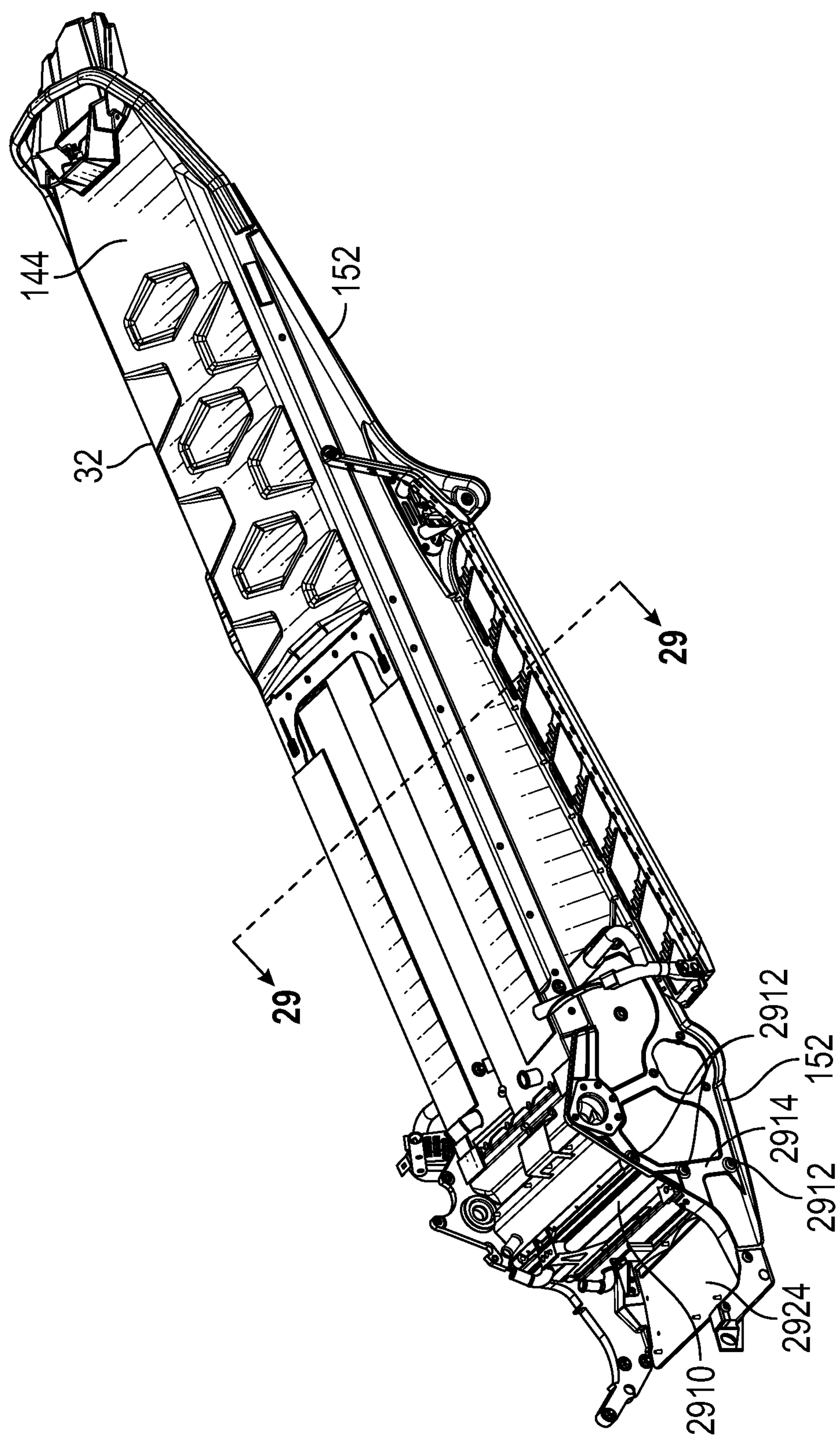
FIG. 28C is a left side perspective front view of the tunnel showing the flange and the cooler 2910.

Referring now FIG. 28A, the right side of the tunnel is illustrated. In this example, the use of the lower flanges that extend from the rear of the vehicle from behind the lower suspension mount 164 is set forth. The right lower flange 154 extends forward of the jackshaft 2810 of the engine assembly 70. As illustrated in FIGS. 25-27, an engine mount is illustrated at the end of the left side and left sidewalls 120, 122. The first sidewall 120 and the second sidewall 122 extend forward of the engine and in particularly, the jackshaft 2810 and reinforcement areas that are thicker than the nominal wall thickness. The longitudinally extending flange 154 is best illustrated in FIG. 28B. The right lower flange 154 is shown from a partial underside perspective view extending forward all the way to a position forward of the longitudinal position of the crankshaft 2810. FIG. 28C shows the left side and left lower flange 152 that extends rearward of the lower suspension mount 162 and longitudinally forward of the position of the crankshaft 2810.

Figure 29A:
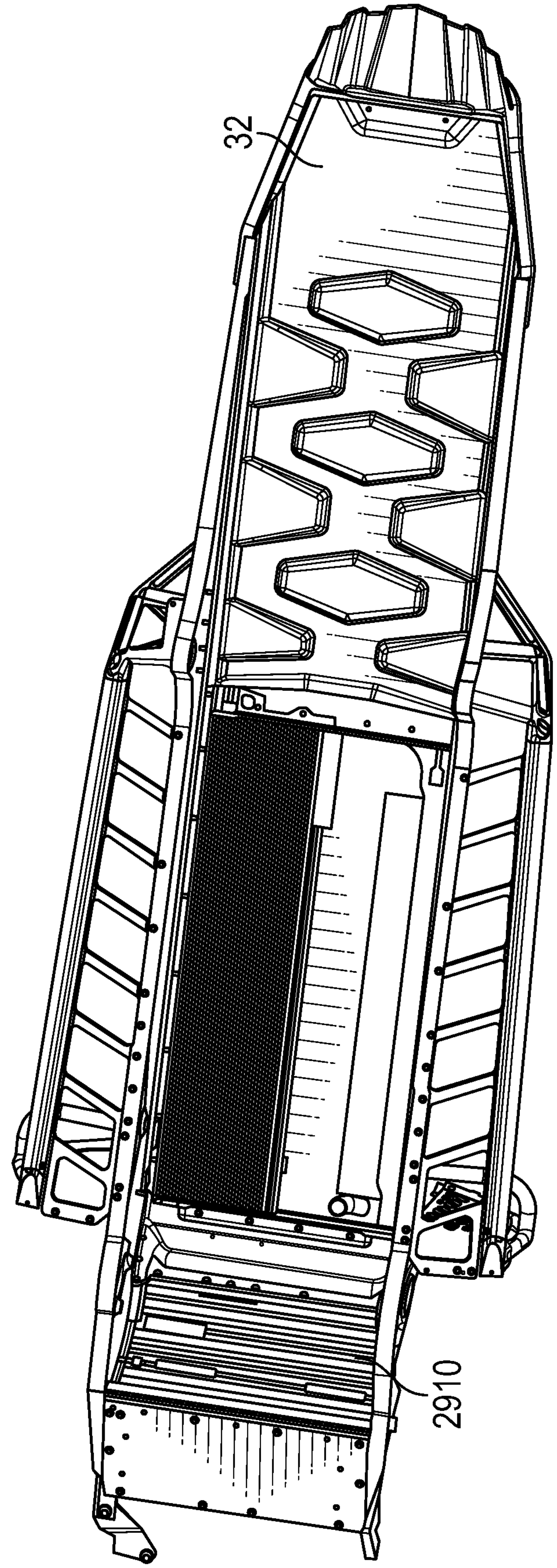
FIG. 29A is an underside view of the tunnel of FIG. 28C.
Figure 29B:
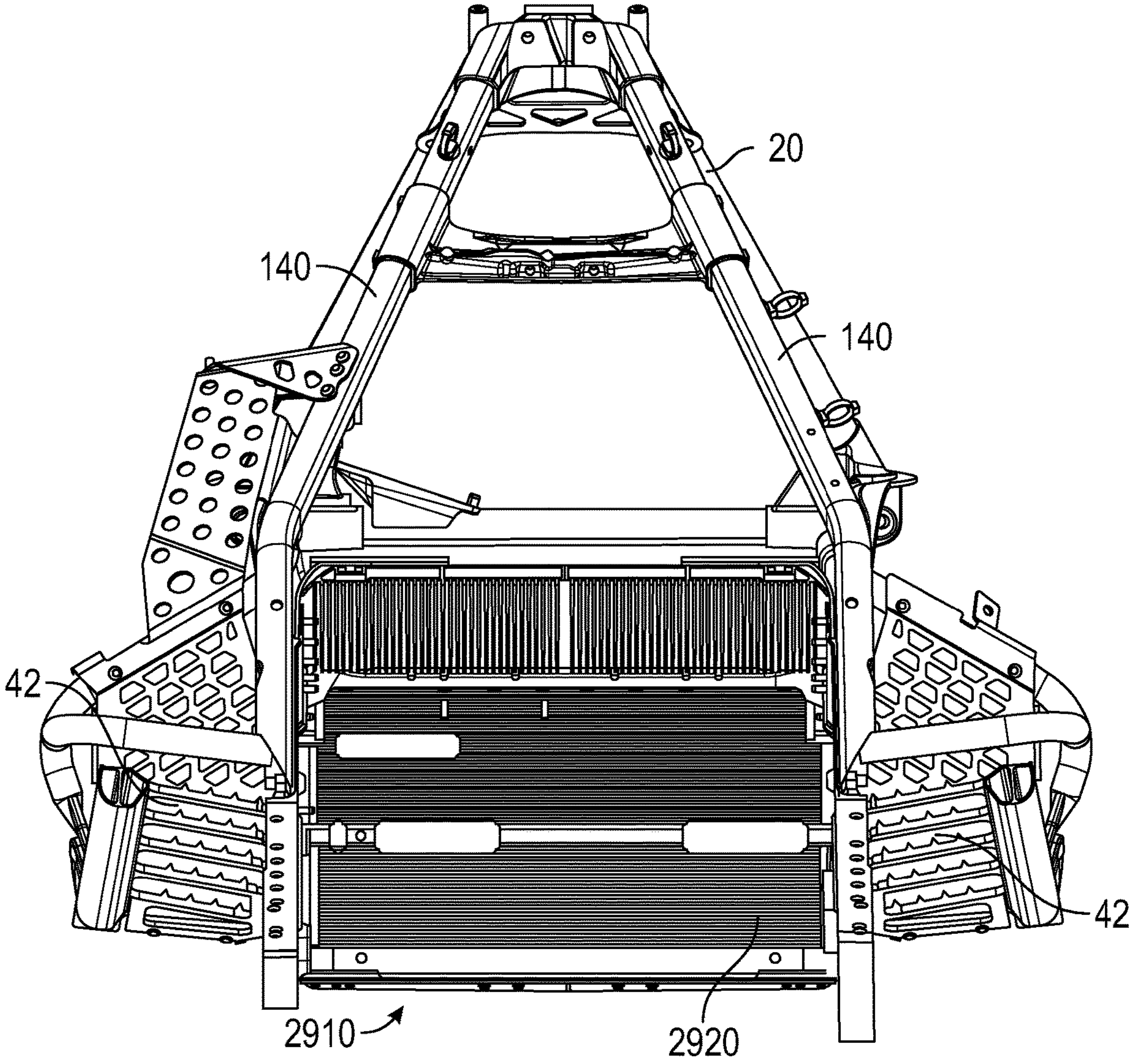
FIG. 29B is a cutaway view looking toward the front of the cooler.
Figure 29C:
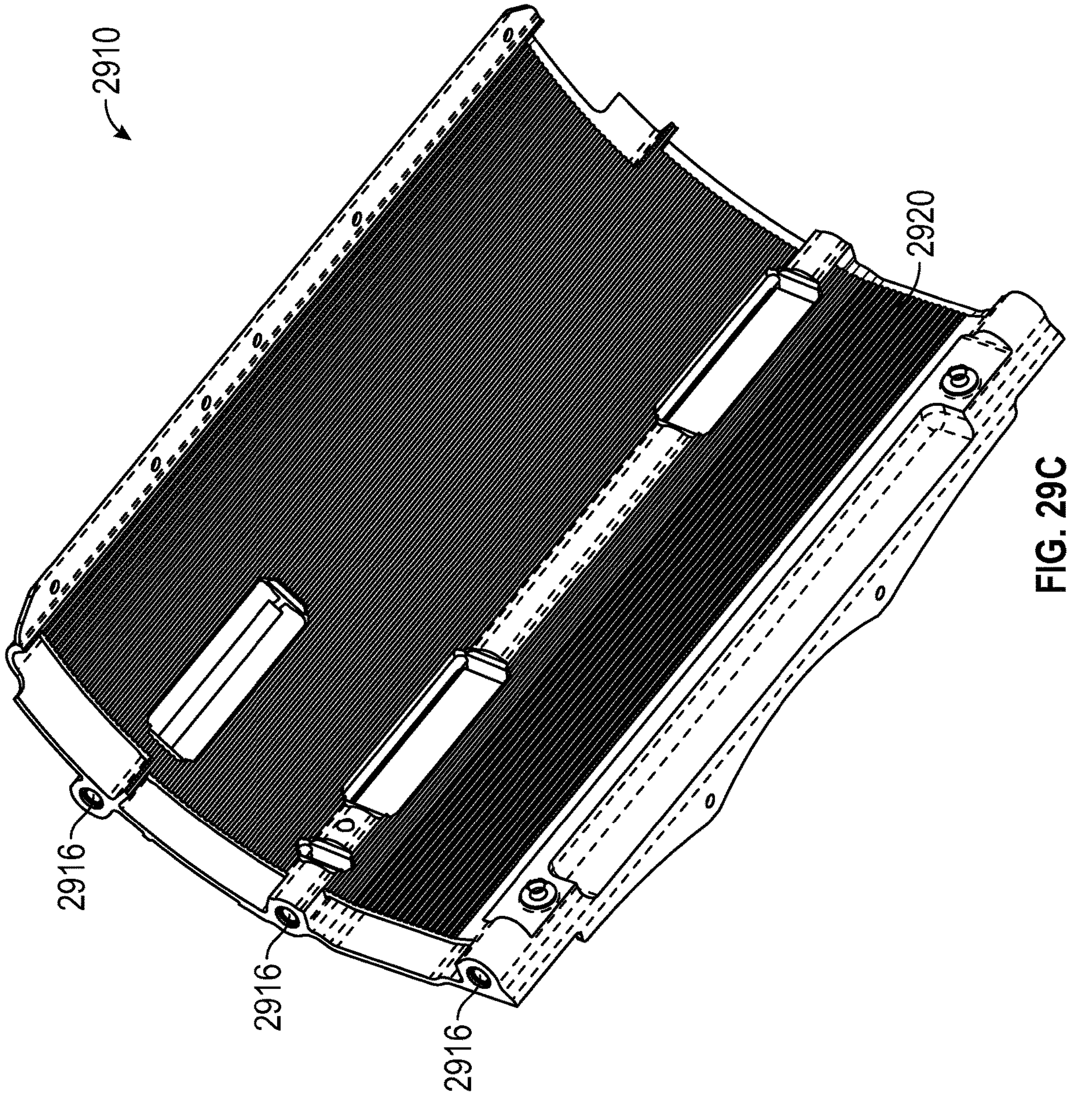
FIG. 29C is a perspective inside view of the cooler.
Figure 29D:
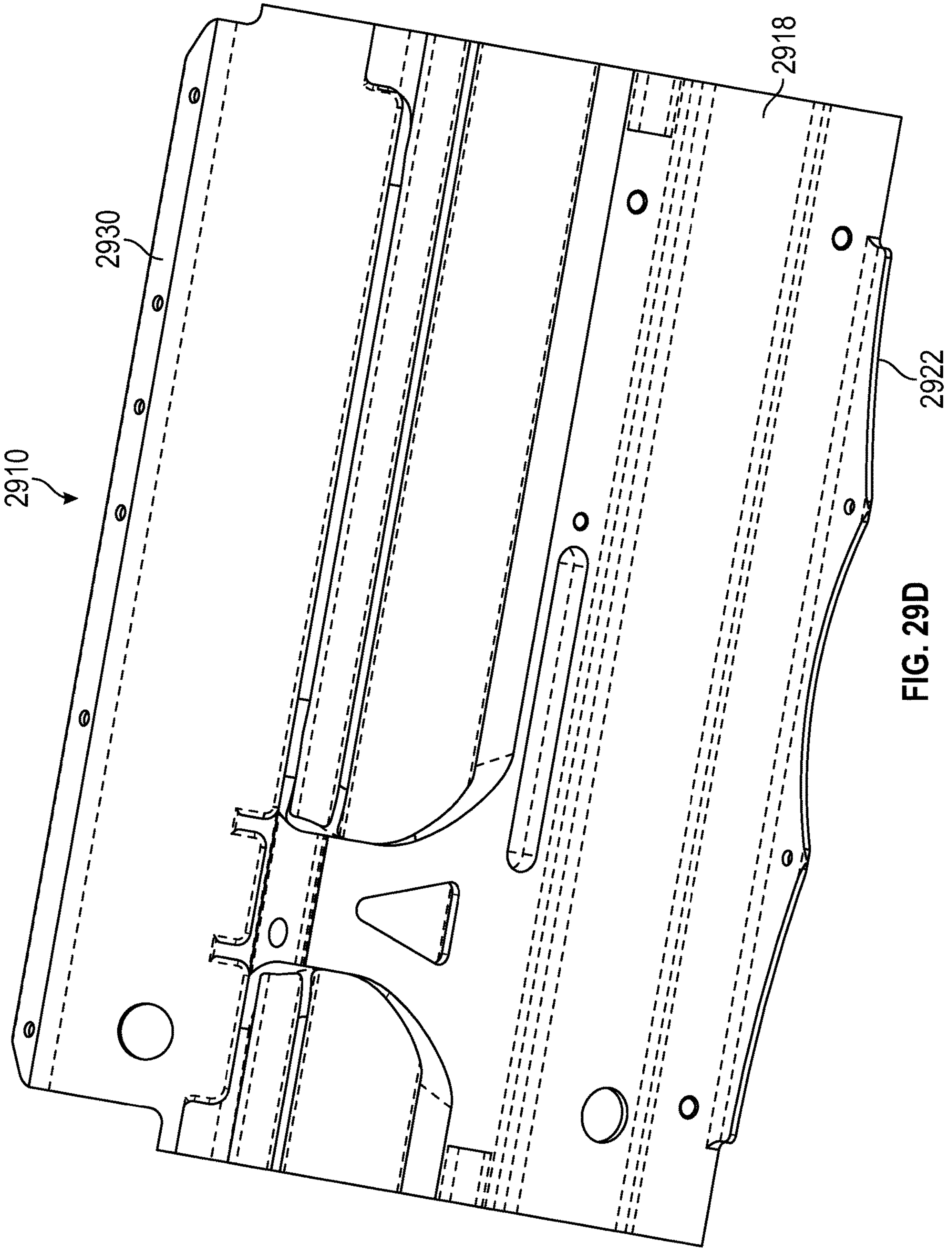
FIG. 29D is a perspective outside view of the cooler of FIG. 29C.
Figure 29E:
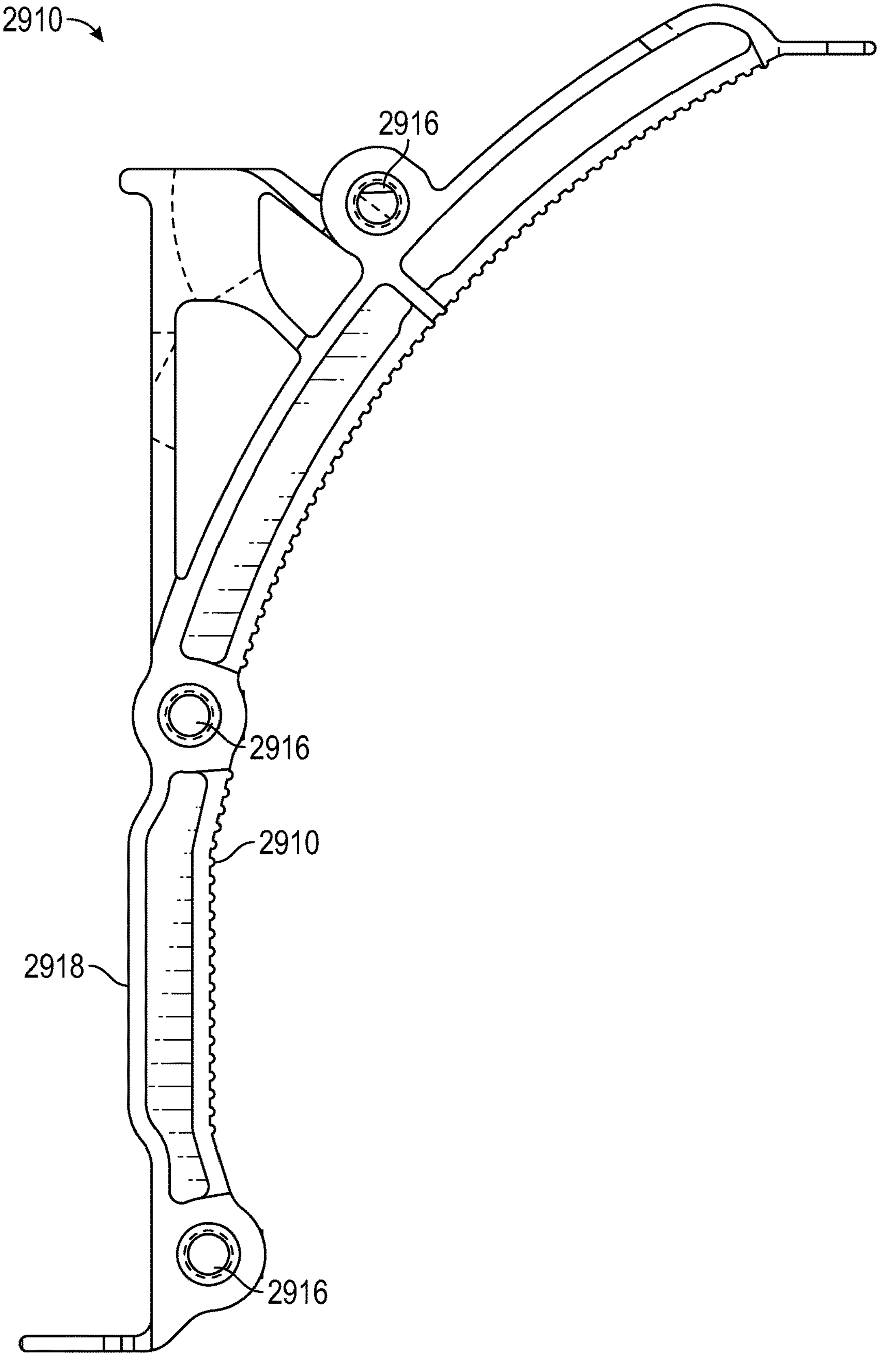
FIG. 29E is a side view of the cooler of FIGS. 29A-29D.

Referring now to FIGS. 28C and 29A-29E, the position of a generally vertically oriented cooler 2910 is set forth. The cooler 2910 is positioned between the first sidewall 120 and the second sidewall 122. Fasteners 2912 illustrated in FIG. 28C extend through a reinforced portion 2914 of the sidewall 120. The reinforced portion 2914 is thicker than the nominal thickness of the sidewall. Fasteners receivers 2916, illustrated best in FIGS. 29C and 29E, are used to receive the fasteners 2912. The cooler 2910 has a cover side 2918 and a cooling side 2920 that is used to contact the snow within the tunnel and therefore cool the engine coolant that passes through the cooler 2910. A flange 2922 illustrated in FIG. 29D is used to couple to the floor pan 2924 of the chassis 20. Reinforced portions are also disposed on the right side of the vehicle for receiving fasteners and coupling the cooler 2910 to the second sidewall 122. An upper flange 2930 disposed on the cooler 2910 is used for coupling the upper portion of the cooler 2910 to the top plate 114.

Figure 30:
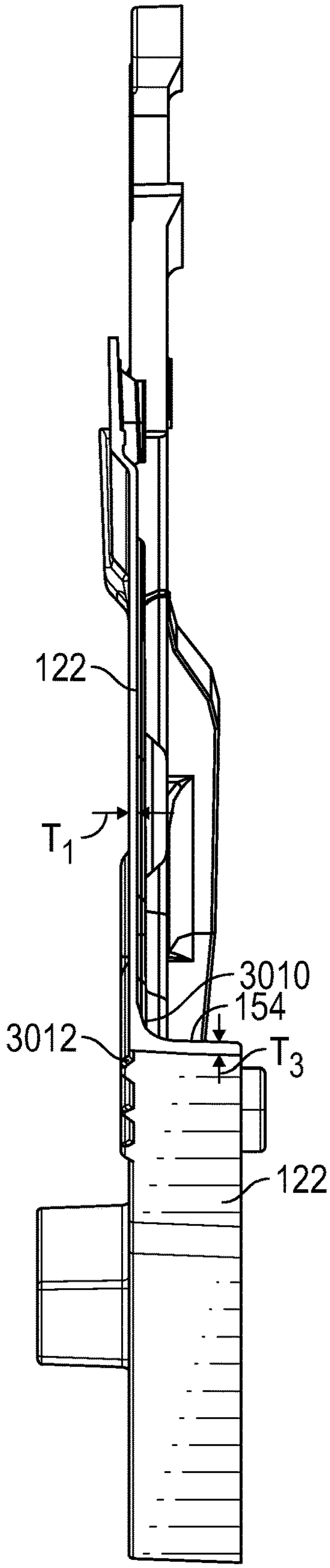
FIG. 30 is a side cross-sectional view of the second sidewall 122.

Referring now to FIG. 30, the second sidewall 122 is illustrated in cross-section. The right sidewall 122 and a close up of the right lower flange 154 is illustrated. The flange 154 is formed as a perpendicular extension from the sidewall 122. In this example, the sidewall 122 has a thickness T1 as described above. The thickness T1 is referred to as either the primary or nominal thickness of the sidewall 122. The right lower flange 154 has a thickness T3 that may be the same as the thickness T2 or different therefrom. The thickness T3 is formed by a first radius 3010 which has a large diameter and a second radius 3012 which has a smaller diameter. Of course, the thicknesses T1, T2 and T3 may all be uniform in thickness. The radius 3010 is on the inside of the 90° angle that forms the right lower flange 154 from the sidewall 122. The sidewall portion 122 is generally perpendicular near the flange 154. The outer wall of the angle between the sidewall 122 and the flange 154 is smaller. This allows the thickness T3 to be formed different than the thickness T1 of the sidewall 122. It should be noted that the sidewall 120 and the left lower flange 152 may be formed in a similar manner. Further, other components may also extend from the sidewalls 120, 122 or the top plate 114. These may include different surfaces or components than the flange. Because the sidewalls 120, 122 and the top plate 114 are molded, different thickness may be formed in different areas.

Figure 31A:
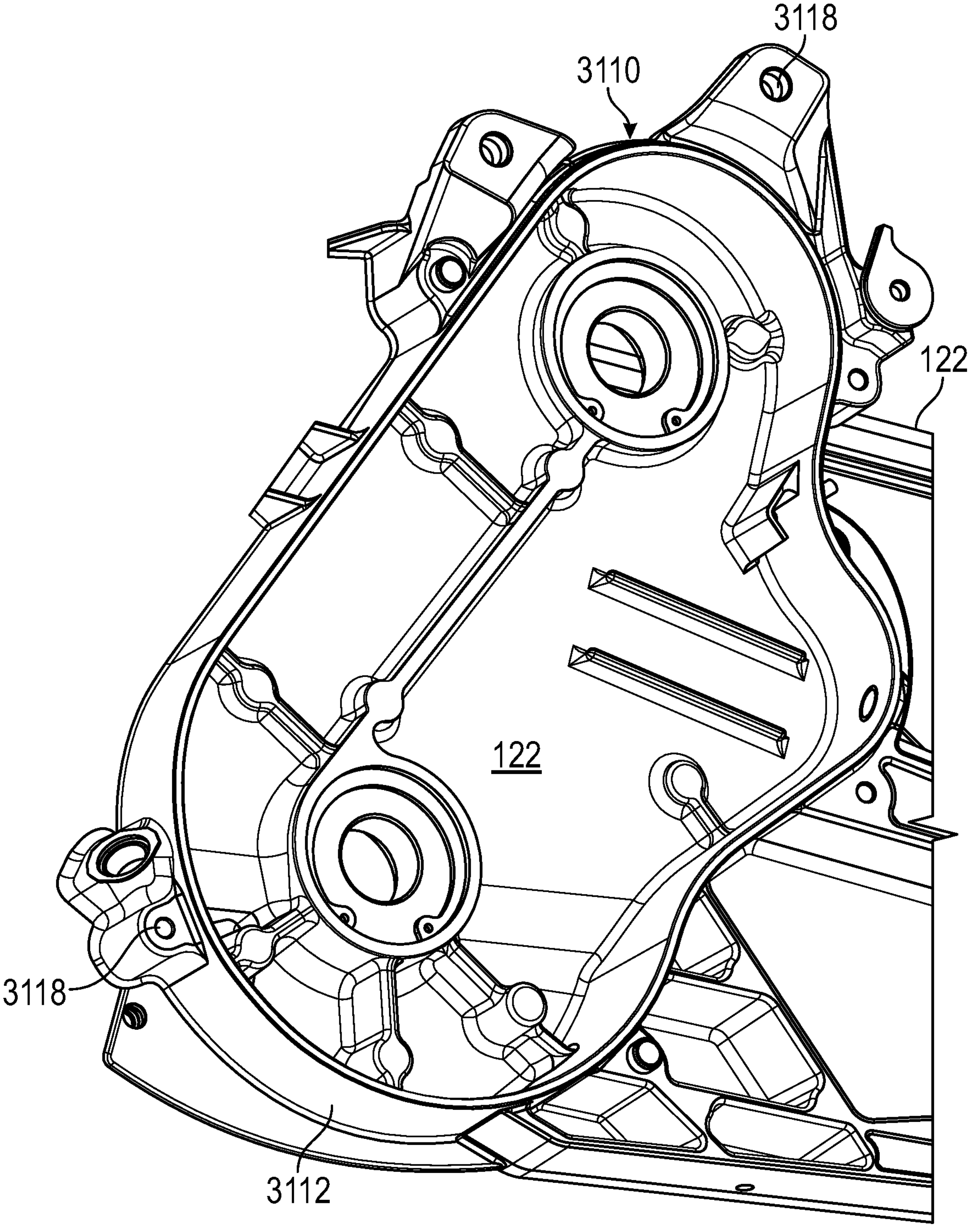
FIG. 31A is a perspective view of the chain case.
Figure 31B:
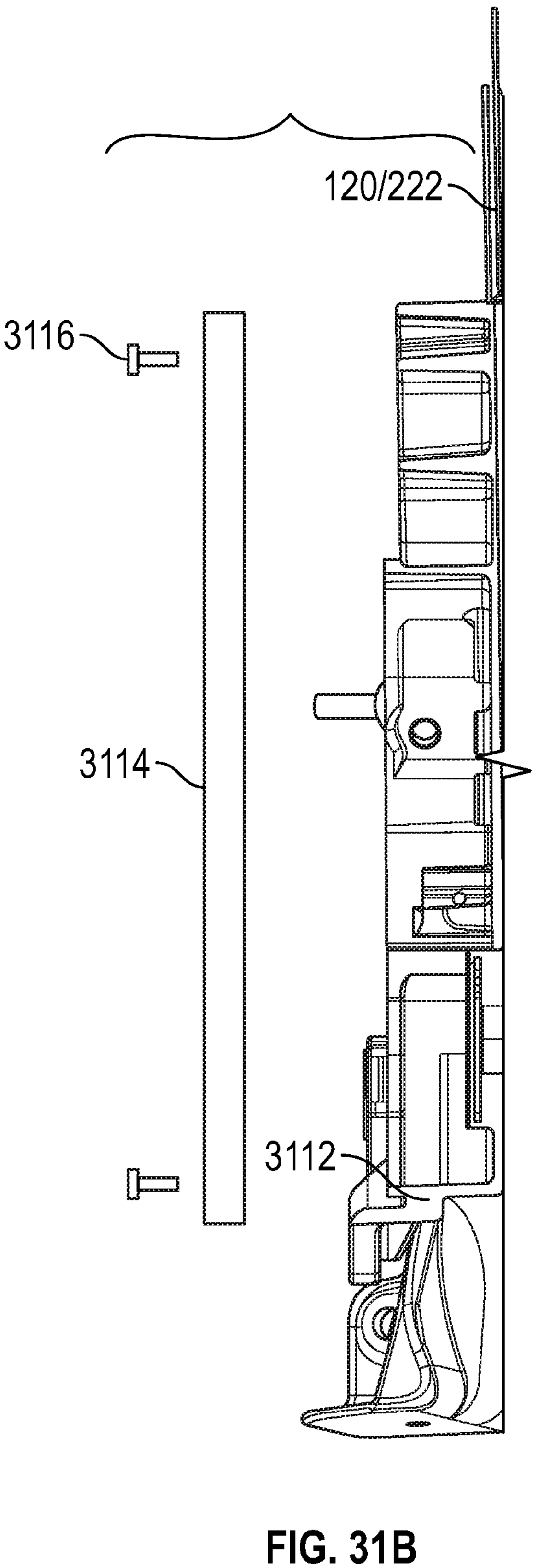
FIG. 31B is a cross-sectional view of the chain case mounted to the first sidewall 120 or the second sidewall 122.

Referring now to FIGS. 31A and 31B, a chain case 3110 is illustrated partially integrally molded with one of the sidewalls as a fluid containment system, in this example, the sidewall 122, as an alternative embodiment. The sidewall 122 also forms one side of the chain case. The chain case has laterally extending walls 3112, a cover 3114 is fastened to the laterally extending walls 112 using fasteners 3116 that are received in the fastener receivers 3118 illustrated best in FIG. 31A. The chain case 3110 is used to hold chain case lubrication fluid therein. The chain case 3110 may also include a plurality of sprockets or gears (not illustrated) for rotatably coupling to the chain (also not illustrated).

Figure 32A:
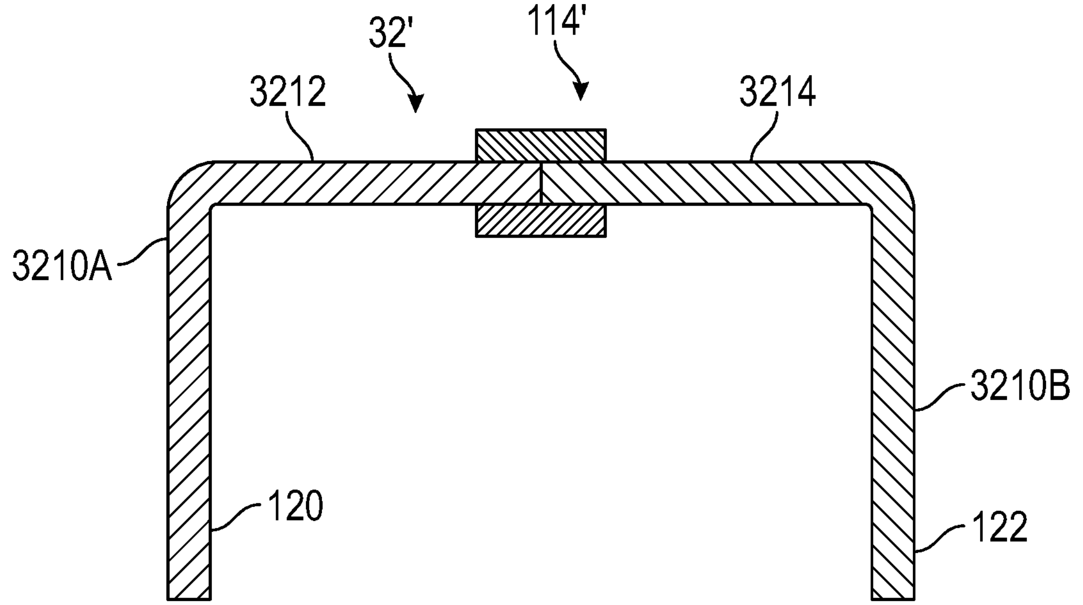
FIG. 32A is a cross-sectional view of a second example of a tunnel construction.

Referring now to FIG. 32A, an alternate tunnel 32' is illustrated. In this example, the tunnel, instead of being three main components as illustrated above, includes two components 3210A, 3210B. Each component forms a right angle. Each right angle forms one of the first sidewall 120 or the second sidewall 122 and a first part 3212 or a second part 3214 of the top plate 114'.

Figure 32B:
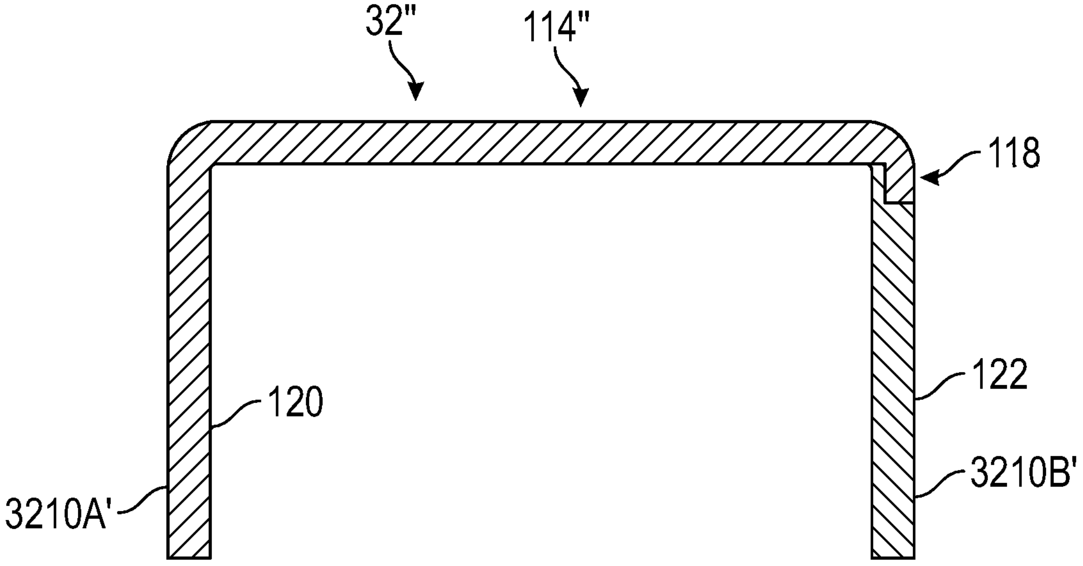
FIG. 32B is a cross-sectional view of a third example of a tunnel construction.

In the example illustrated in FIG. 32B, the top plate 114" is formed in the first portion 3210A'. The sidewall 122 is formed in the second portion 3210B'. A flange 118 may be formed in a similar manner to that described above for joining the sidewall 122 to the top plate 114".

In the example set forth in FIGS. 32A and 32B, the portions 3210A' and 3210B' and 3210A and 3210B are formed of molded material. This allows various shapes to be formed.

Figure 33A:
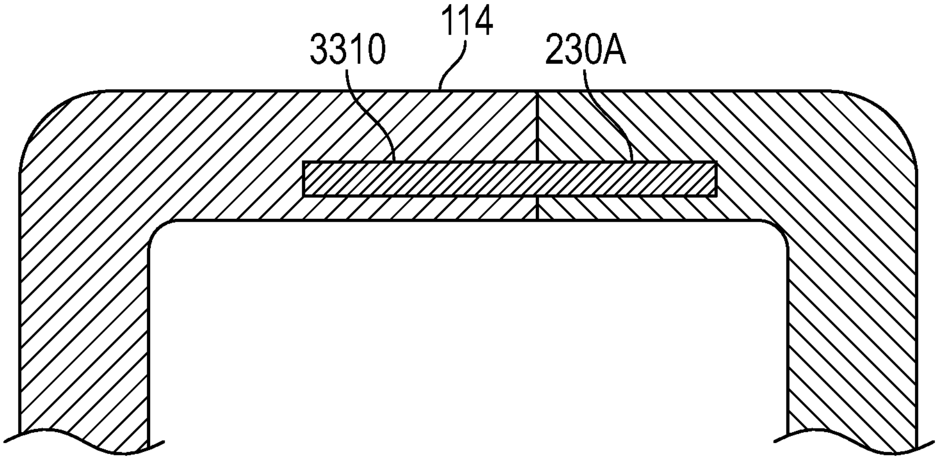
FIG. 33A is a cross-sectional view of the tunnel having a portion of the cooler 3310 integrally molded therein.

Referring now to FIG. 33A, top plate 114 is illustrated with part of the first cooler 230A integrally molded therein. In this example, the first cooler 230A has a first portion 3310 integrally molded into the top plate 114.

Figure 33B:
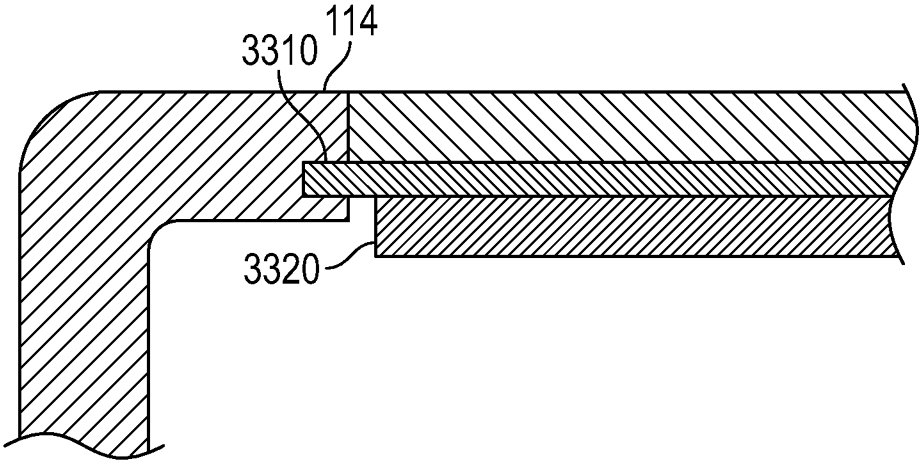
FIG. 33B is a cross-sectional view showing a first portion of the cooler 3310 integrally molded and a second portion 3320 that is coupled to the first portion 3310.

In FIG. 33B, the first portion 3310 is illustrated integrally molded within the top plate 114. A second portion 3320 that is coupled to the top portion 3310 is coupled to the first portion 3310. The second portion of the cooler 3320 may extend within the opening within the top plate 114.

Figure 34A:
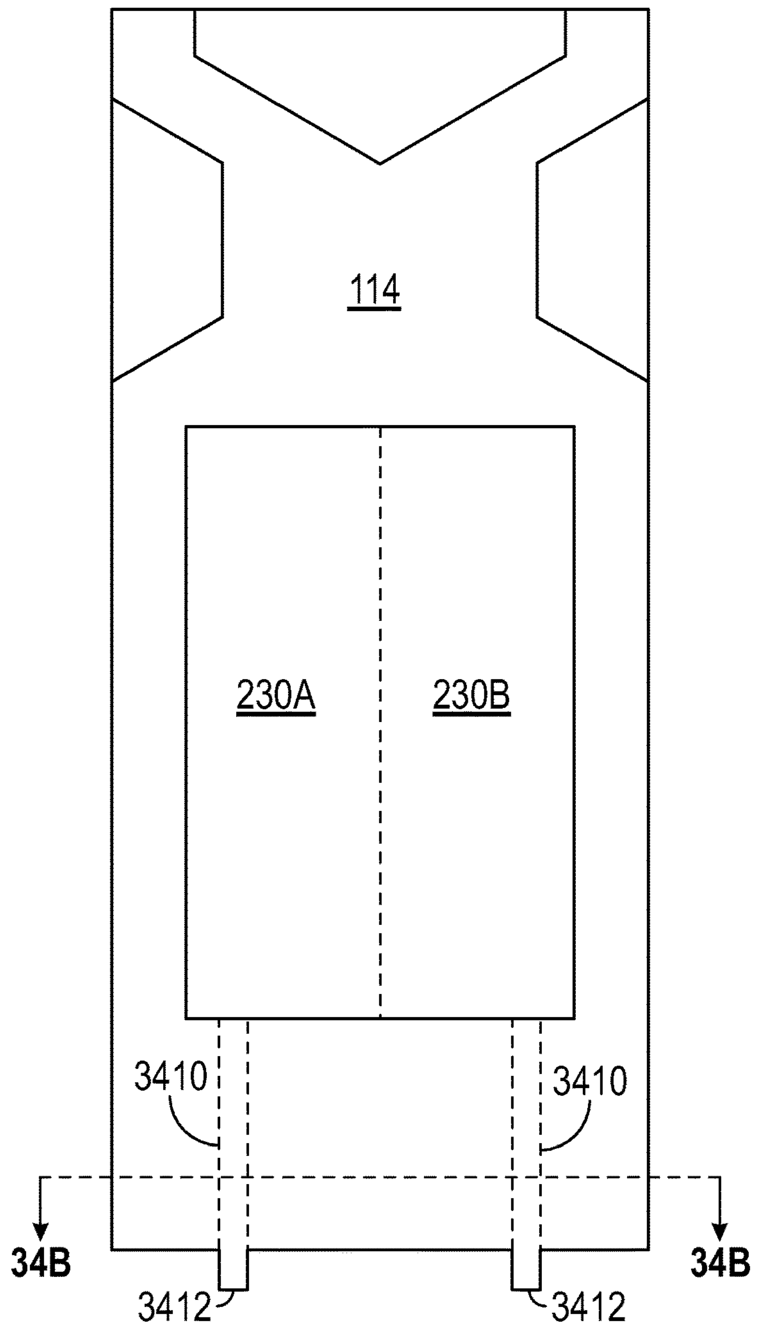
FIG. 34A is a top view of an alternate example of a top plate 114.
Figure 34B:
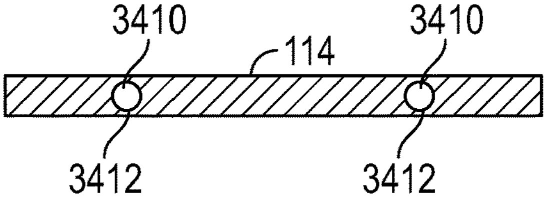
FIG. 34B is a cross-sectional view of the top plate of FIG. 34A.

Referring now to FIGS. 34A and 34B, the top plate 114 is illustrated having an integrally formed fluid channels 3410. The fluid channels may lead to a component such as the coolers 230A, 230B or the second portion 3320 of the cooler illustrated in FIG. 33B. The fluid channels 3410 may have a fitting 3412 extending therefrom. The fittings 3412 allow a host, for example, couple to the engine assembly. Typically, an inlet fluid channel and an outlet fluid channel may be provided. The fluid channels 3410 provided in FIGS. 34A and 34B are used for communicating fluid between the engine assembly and the cooler 230A, 230B. However, other uses for the fluid channels with other fluids may be provided.

Figure 34C:
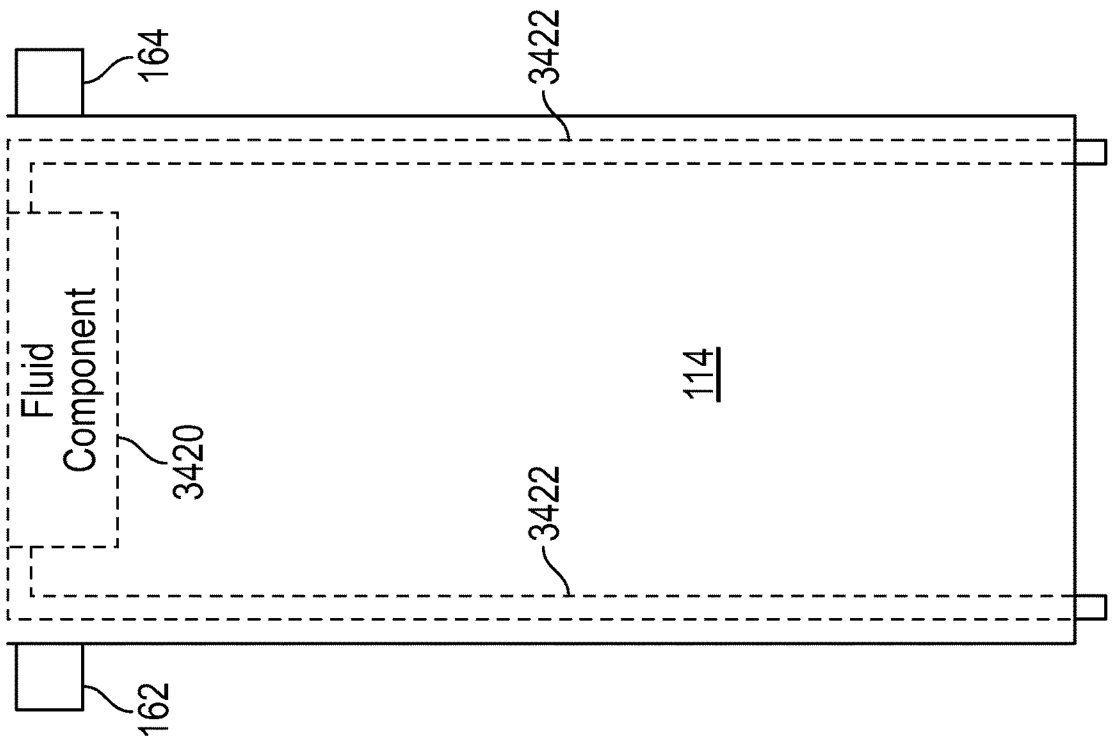
FIG. 34C is a top view of a third example of a top plate 114.

Referring now to FIG. 34C, the top plate 114 is illustrated having a fluid component integrally molded or partially integrally molded therein. The fluid component 3420 may also be mounted to the top plate 114 as a separate component. However, fluid channels 3422 communicate fluid through the top plate 114 to the engine or other suitable component. The fluid component 3420 may be located at or rearward of the suspension mounts 162, 164 and forward of the rear pads 238A, 238B (in FIGS. 21-23).

Referring now to FIG. 35, as mentioned briefly in reference to FIG. 34C, a fluid component 3420 may be provided. One example is a fluid containment system 3510 such as a fluid containment system may be partially or integrally formed with the first sidewall 120, the second sidewall 122 or the top plate 124. The fluid containment system 3510 may include walls 3512, 3514 that extend from one of the first sidewall 120, the second sidewall 122 or the top plate 114. The fluid containment system 3510 may also be lined with an impenetrable material like the liner 3640 described below. Examples of a fluid containment system include an oil reservoir, a coolant tank, a heat exchanger, a chain case or a fuel tank.

Referring now to FIGS. 36A-36E, the sidewalls 120, 122 or the top plate 114 may have a mount 3610 coupled thereto. The mount 3610 has a thickness T5 that is larger than the nominal thickness T1 of the top plate 114, the first sidewall 120 or the second sidewall 122. The mount 3610 has a fastener opening 3612 for receiving a fastener 3614. In FIG. 36A, the mount 3610 is used for mounting a brake caliper 3630 thereto. The fastener 3614 couples to the wall or outer housing of the brake caliper 3630.

Referring now to FIG. 36B, the mount 3610 is used for mounting an air box 3632 to the mount 3610. The air box 3632 provides intake air to the engine.

Referring now to FIG. 36C, the mount 3610 may be used for coupling a muffler 3634 thereto. The muffler 3634 may also be referred to as a silencer.

Referring now to FIG. 36D, the mount 3610 may also be used for coupling an oil pump 3636 thereto.

Referring now to FIG. 36E, the mount 3610 may also be used for coupling a fuel tank 3638 thereto. A liner 3640 may be coupled therein so that the tunnel surface or sidewalls do not directly contact the fuel.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tunnel configured to cover at least a portion of an endless track of a snow vehicle, the tunnel comprising:

a top plate extending longitudinally, the top plate having a first flange extending from a first side edge and a second flange extending from a second side edge;

a first sidewall coupled to the first flange extending generally parallel with the first flange; and a second sidewall coupled to the second flange extending generally parallel with the second flange, wherein the tunnel further comprises a cooler opening reinforcement area disposed adjacent a cooler opening in the top plate.

2. The tunnel of claim 1, wherein the first flange comprises a first inner surface and the first sidewall comprises a first outer surface coupled to the first inner surface, and wherein the second flange comprises a second inner surface and the second sidewall comprises a second outer surface coupled to the second inner surface.

3. The tunnel of claim 1, wherein the first flange is coupled to the first sidewall and the second flange is coupled to the second sidewall with fasteners.

4. The tunnel of claim 1, wherein the first flange is coupled to the first sidewall and the second flange is coupled to the second sidewall with adhesive and fasteners.

5. The tunnel of claim 1, wherein the first flange and the first sidewall form a first channel therebetween and the second flange and the second sidewall form a second channel therebetween and wherein adhesive is disposed in the first channel and the second channel.

6. The tunnel of claim 5, wherein the first channel is formed between a first spacer and a second spacer disposed between the first flange and the first sidewall.

7. The tunnel of claim 6, wherein the first spacer and the second spacer are integrally formed with the first sidewall or flange or both.

8. The tunnel of claim 7, wherein the first sidewall comprises a first offset, said first spacer is disposed in the first offset.

9. The tunnel of claim 5, wherein the first channel and the second channel are uniform in depth longitudinally.

10. The tunnel of claim 1, wherein the first sidewall comprises a bearing carrier integrally molded therein.

11. The tunnel of claim 10, wherein the bearing carrier comprises a first bearing receiver and a second bearing receiver.

12. The tunnel of claim 11, wherein the first bearing receiver comprises a first bearing rotatably coupled to a jackshaft and the second bearing receiver comprising a second bearing coupled to a drive shaft.

13. The tunnel of claim 11, wherein the first bearing receiver and the second bearing receiver are coupled to a structural member disposed therebetween.

14. The tunnel of claim 1, further comprising a lower mount extending downward from the first sidewall for mounting to a first torque arm, said lower mount integrally formed in the first sidewall.

15. The tunnel of claim 14, wherein the lower mount is further coupled to a first running board.

16. The tunnel of claim 15, wherein the first running board is coupled to a lower flange of the first sidewall, said lower flange comprising a laterally extending surface coupled to the first running board.

17. The tunnel of claim 1, further comprising a first running board coupled to a first lower flange of the first sidewall and a second running board coupled to a second lower flange of the second sidewall.

18. The tunnel of claim 1, further comprising a first running board coupled to a first lower flange of the first sidewall and a second running board coupled to a second lower flange with vertically extending fasteners.

19. The tunnel of claim 1, wherein the first flange comprises first bumper mount and the second flange comprises a second bumper mount, said first bumper mount and the second bumper mount coupled to a bumper.

20. The tunnel of claim 19, wherein the bumper is coupled above a flap.

21. The tunnel of claim 20, wherein the flap is disposed in a recess of the top plate.

22. The tunnel of claim 21, further comprising a lateral wall disposed laterally across the top plate at a distal end thereof, said lateral wall adjacent the top plate.

23. The tunnel of claim 1, wherein the cooler opening reinforcement area is disposed around the cooler opening in the top plate.

24. The tunnel of claim 1, wherein the top plate comprises a primary thickness and structural reinforcement areas comprising a secondary thickness greater than the primary thickness.

25. The tunnel of claim 1, wherein a front portion of the first sidewall comprises a pocket integrally molded therein.

26. The tunnel of claim 1, further comprising a vertical cooler assembly extending from the first sidewall to the second sidewall.

27. The tunnel of claim 26, further comprising fasteners extending through the first sidewall and the vertical cooler.

28. The tunnel of claim 1, wherein the first sidewall, second sidewall or the top plate forms at least a portion of a fluid containment system.

29. The tunnel of claim 28, wherein the fluid containment system comprises a chain case.

30. The tunnel of claim 28, wherein the fluid containment system comprises a cooler.

31. The tunnel of claim 28, wherein the fluid containment system comprises a fuel tank.

32. The tunnel of claim 28, wherein the fluid containment system comprises an oil tank, a coolant tank or heat exchanger.

33. The tunnel of claim 1, wherein the top plate, the first sidewall, and the second sidewall each are formed of a sheet molded composite, and wherein the sheet molded composite of at least one of the first sidewall, the second sidewall, or the top plate includes a tape.

34. The tunnel of claim 1, wherein the top plate, the first sidewall, and the second sidewall each are formed of a sheet molded composite, and wherein the sheet molded composite of least one of the first sidewall, the second sidewall, or the top plate is overmolded on one or more components.

35. The tunnel of claim 34, wherein the one or more components are formed from metal.

36. The tunnel of claim 34, wherein the one or more components include a bearing carrier, the bearing carrier formed of a metal, the bearing carrier including a first bearing receiver, a second bearing receiver, and one or more molding flanges extending around a periphery of the bearing carrier, the one or more molding flanges including one or more molding holes.

37. The tunnel of claim 34, wherein the one or more components include a mount.

38. The tunnel of claim 1, wherein the first side wall is formed of a sheet molded composite and the first side wall includes one or more first portions having a first thickness of the sheet molded composite and one or more second portions having a second thickness of the sheet molded composite, the second thickness being greater than the first thickness, and wherein the first side wall further includes a torque arm mounting area surrounding a torque arm mount configured to receive a torque arm, the torque arm mounting area having the second thickness of the sheet molded composite.

39. A tunnel configured to cover at least a portion of an endless track of a snow vehicle, the tunnel comprising:

a top plate extending longitudinally, the top plate having a first flange extending from a first side edge and a second flange extending from a second side edge;

a first sidewall coupled to the first flange extending generally parallel with the first flange; and a second sidewall coupled to the second flange extending generally parallel with the second flange, wherein the top plate comprises a primary thickness and a cooler opening reinforcement area comprising a secondary thickness greater than the primary thickness.

40. The tunnel of claim 39, further comprising a cooler coupled to the cooler opening reinforcement area.

41. The tunnel of claim 40, wherein the cooler comprises a first cooler and a second cooler.

42. A tunnel configured to cover at least a portion of an endless track of a snow vehicle, the tunnel comprising:

a top plate extending longitudinally, the top plate having a first flange extending from a first side edge and a second flange extending from a second side edge;

a first sidewall coupled to the first flange extending generally parallel with the first flange; and a second sidewall coupled to the second flange extending generally parallel with the second flange, wherein a front portion of the first sidewall comprises a pocket integrally molded therein, and the pocket receives a tab of an engine mount.

43. The tunnel of claim 42, wherein the first sidewall comprises a locator pocket on an inner surface of the first sidewall for receiving a locater disposed on the engine mount.

44. The tunnel of claim 42, wherein the tab comprises a narrow portion and a wide portion, the narrow portion of the tab received in a narrow portion of the pocket, the wide portion of the tab received in a wide portion of the pocket.

45. The tunnel of claim 44, wherein the pocket is laterally extending.

46. The tunnel of claim 42, wherein the engine mount is composed of a different material than the first sidewall.

* * * * *